United States Patent
Zhang et al.

(10) Patent No.: US 12,411,835 B2
(45) Date of Patent: Sep. 9, 2025

(54) ACCESS AUTHORIZATION FOR AUDIT INFORMATION IN A MULTI-TENANCY DATA MANAGEMENT SYSTEM

(71) Applicant: Rubrik, Inc., Palo Alto, CA (US)

(72) Inventors: Zhebin Zhang, San Jose, CA (US); Hao Wu, Mountain View, CA (US); Kevin Mu, Saratoga, CA (US); Xiang Xu, Foster City, CA (US); Jordan Marcell Barkley, Santa Clara, CA (US)

(73) Assignee: Rubrik, Inc., Palo Alto, CA (US)

( * ) Notice: Subject to any disclaimer, the term of this patent is extended or adjusted under 35 U.S.C. 154(b) by 0 days.

(21) Appl. No.: 18/102,326

(22) Filed: Jan. 27, 2023

(65) Prior Publication Data

US 2024/0256518 A1   Aug. 1, 2024

(51) Int. Cl.
*G06F 16/28* (2019.01)
*G06F 16/23* (2019.01)

(52) U.S. Cl.
CPC ........ *G06F 16/2358* (2019.01); *G06F 16/288* (2019.01)

(58) Field of Classification Search
None
See application file for complete search history.

(56) References Cited

U.S. PATENT DOCUMENTS

| | | |
|---|---|---|
| 5,878,415 A | 3/1999 | Olds |
| 10,747,438 B1 | 8/2020 | Donohue et al. |
| 11,315,041 B1 | 4/2022 | Jain et al. |
| 2002/0107875 A1* | 8/2002 | Seliger ................ G06F 21/6272 |
| 2004/0210755 A1 | 10/2004 | Becker et al. |
| 2005/0257066 A1 | 11/2005 | John et al. |
| 2006/0294051 A1 | 12/2006 | Kapadia et al. |

(Continued)

FOREIGN PATENT DOCUMENTS

| | | | | |
|---|---|---|---|---|
| CN | 111684440 A | | 9/2020 | |
| CN | 111865943 A * | 10/2020 | ........... H04L 63/083 |

(Continued)

OTHER PUBLICATIONS

Hierarchical Multi-Tenant Pattern, Bien et al .Characterizing the Performance of Tenant Data Management in Multi-Tenant Cloud Authorization Systems (Year: 2014).

*Primary Examiner* — Augustine K. Obisesan
(74) *Attorney, Agent, or Firm* — Holland & Hart LLP

(57) ABSTRACT

Methods, systems, and devices for data management are described. A data management system (DMS) may provide backup services for multiple tenants. The DMS may receive a request to provide a first user of the DMS with audit information associated with an entity of the DMS. The DMS may identify context information for a log-in session associated with the request. The context information may include an identifier (ID) of a tenant associated with the request. The DMS may identify, based on the ID of the tenant, authorization information associated with the tenant. The authorization information may indicate that the tenant has access to a set of entities within a hierarchy associated with the DMS. The DMS may determine whether to output the requested audit information to the first user based on a hierarchical relationship, within the hierarchy, between the tenant and the entity.

18 Claims, 14 Drawing Sheets

(56) References Cited

U.S. PATENT DOCUMENTS

| | | | |
|---|---|---|---|
| 2007/0136603 A1* | 6/2007 | Kuecuekyan | H04L 63/0884 |
| | | | 713/185 |
| 2009/0282045 A1 | 11/2009 | Hsieh et al. | |
| 2010/0319067 A1 | 12/2010 | Mohanty et al. | |
| 2011/0030038 A1* | 2/2011 | Dillaway | G06F 21/6218 |
| | | | 726/4 |
| 2011/0213789 A1 | 9/2011 | Doshi et al. | |
| 2011/0239293 A1* | 9/2011 | Perumal | G06F 21/552 |
| | | | 726/21 |
| 2014/0068732 A1* | 3/2014 | Hinton | G06F 21/41 |
| | | | 726/6 |
| 2015/0073858 A1* | 3/2015 | Philip | G06F 16/248 |
| | | | 705/7.27 |
| 2016/0057150 A1* | 2/2016 | Choi | H04L 63/104 |
| | | | 726/1 |
| 2016/0259807 A1 | 9/2016 | Factor et al. | |
| 2017/0242881 A1 | 8/2017 | Northfleet et al. | |
| 2017/0371942 A1 | 12/2017 | Baumgaertel et al. | |
| 2018/0046637 A1 | 2/2018 | Koopman et al. | |
| 2019/0364051 A1* | 11/2019 | Ferrans | G06F 16/9024 |
| 2020/0120098 A1 | 4/2020 | Berg et al. | |
| 2020/0344109 A1* | 10/2020 | Shil | H04L 41/0846 |
| 2020/0404021 A1* | 12/2020 | Singh | H04L 63/20 |
| 2022/0114277 A1 | 4/2022 | Lee et al. | |
| 2022/0318074 A1 | 10/2022 | Kompaniets et al. | |
| 2022/0343707 A1* | 10/2022 | Johnson | G07C 9/00896 |

FOREIGN PATENT DOCUMENTS

| | | |
|---|---|---|
| JP | 2009259214 A * | 11/2009 |
| WO | 2014/188743 A1 | 11/2014 |

\* cited by examiner

ACCESS AUTHORIZATION FOR AUDIT INFORMATION IN A MULTI-TENANCY DATA MANAGEMENT SYSTEM

FIELD OF TECHNOLOGY

The present disclosure relates generally to data management, including techniques for access authorization for audit information in a multi-tenancy data management system (DMS).

BACKGROUND

A data management system (DMS) may be employed to manage data associated with one or more computing systems. The data may be generated, stored, or otherwise used by the one or more computing systems, examples of which may include servers, databases, virtual machines, cloud computing systems, file systems (e.g., network-attached storage (NAS) systems), or other data storage or processing systems. The DMS may provide data backup, data recovery, data classification, or other types of data management services for data of the one or more computing systems. Improved data management may offer improved performance with respect to reliability, speed, efficiency, scalability, security, or ease-of-use, among other possible aspects of performance.

DETAILED DESCRIPTION

Figure 1:
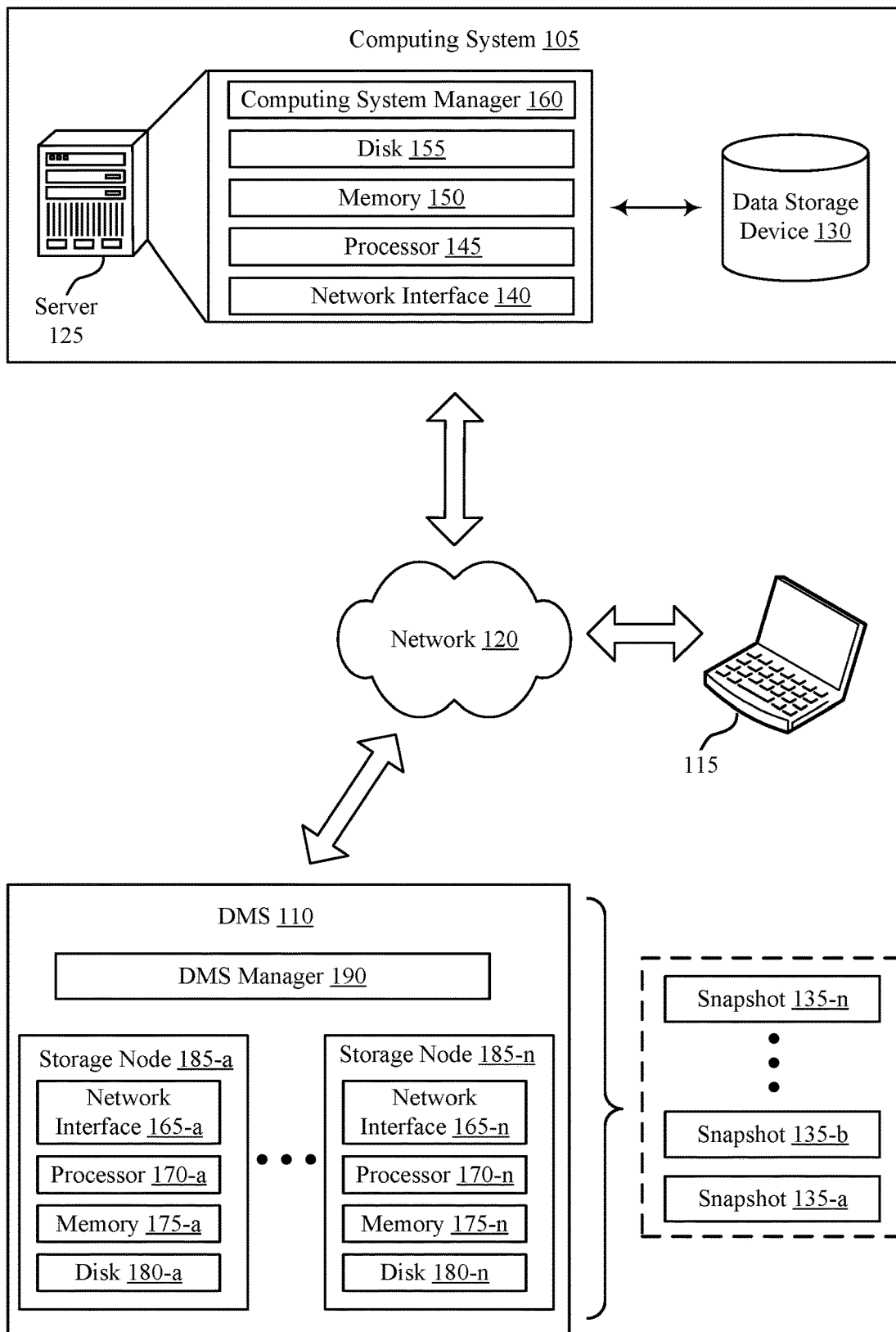
FIG. 1 illustrates an example of a computing environment that supports access authorization for audit information in a multi-tenancy data management system (DMS) in accordance with aspects of the present disclosure.

A multi-tenancy data management system (DMS) may provide backup services for multiple tenants (e.g., organizations or business units). A multi-tenancy DMS also may have resources across cloud platforms and on-premise data centers. In multi-tenant scenarios, multiple tenants (e.g., organizations or business units) may share data management resources. Some multi-tenant scenarios may be multi-level, with multiple hierarchical levels of tenants. For example, resources of a backup and recovery system may be shared among multiple higher-level tenants, and at least some of the higher-level tenants may be associated with one or more levels of lower-level tenants (e.g., subtenants), with resources associated with a higher-level tenant being shared by multiple subtenants of that tenant.

As one such example, which may be referred to as an enterprise scenario, an information technology (IT) services unit of a business (e.g., of a corporation) may be a tenant of a DMS, and multiple other business units of the same business (e.g., within the same corporation) may be subtenants of the IT services unit, and accordingly, may share the same data management services. As another such example, some tenants of a DMS may be multi-service providers (MSPs). An MSP may be a higher-level tenant of a backup and recovery system and may provide IT and data management services to multiple distinct customers, which may be separate businesses that are subtenants of the MSPs. For example, the MSP may subscribe to data management services and resources from the d DMS, and the MSP may use those services and resources to in turn provide data management service to the MSP's subtenants (e.g., an MSP subtenant may not directly subscribe to the DMS, such as due to a lack of internal expertise in configuring or managing the resources or services of the DMS, and thus the MSP subtenant may instead be customer of the MSP, which may directly subscribe to the DMS and use the MSP's subscription to offer data management services to the MSP subtenant).

There may be many tenants of the DMS, and some or all of the tenants may have any number of subtenants. The tenants of the DMS may be enterprise tenants, MSP tenants, other types of entities, or any combination thereof. Further, an entity that is a subtenant of a higher-level tenant may itself have one or more subtenants. That is, there may be three or more levels of tenants—in general, any quantity of levels may exist.

In some examples, a DMS may obtain and store audit information for users of the system. For example, the DMS may generate audit information when a user logs in to the DMS and may update the audit information to indicate operations (e.g., audit events) performed by the user when logged in to the DMS or otherwise associated with the user.

Techniques, systems, and devices described herein provide for a DMS to determine whether a first user that requests access to audit information for an entity of a multi-tenant system has permission to access the audit information associated with the entity, while accounting for impacts of a multi-level hierarchical multi-tenancy environment. The first user may be, for example, an administrator of a tenant that wants to review operations performed by the second user. In some examples, if the entity is a second user, the DMS may determine whether to grant the first user access to the audit information associated with the second user based on an authentication domain that is assigned to a tenant to which the first user has access. For example, the DMS may assign authentication domains to one or more tenants of the multi-tenant system. An authentication domain may include one or more subtenants, user groups, or users that the tenant has authorization over. If the second user is within an authentication domain that has been assigned to the tenant associated with the first user (e.g., the tenant has authorization over the second user), the first user may have permission to access the audit information for the second user. The second user may be a subject of the audit information (e.g., an entity that performed the audit events) or an object of the audit information (e.g., an entity that was the target of the audit events), or both. The DMS may determine an identifier (ID) of the tenant to which the first user has access based on the context for a log-in session for the first user. Thus, the DMS may provide the first user access to the audit information if the tenant of the first user has authorization over the second user, and the DMS may refrain from providing the audit information otherwise.

Additionally, or alternatively, if the entity is a computing object of the DMS, the DMS may determine whether to grant the first user access to the audit information based on a set of computing objects to which the tenant of the first user has access within a computing object hierarchy of the DMS. For example, if the first user requests to view audit information associated with audit events performed on one or more computing objects or other entities, the DMS may output the requested audit information to the first user if the one or more computing objects are included in the set of computing objects to which the tenant of the user has access, and the DMS may refrain from outputting the requested audit information otherwise. The DMS may thereby perform access control for audit information based on a subject of the audit information (e.g., a user), or an object of the audit information (e.g., a user, a computing object, or some other entity), or both.

In some examples, when generating an audit report for a given user, the DMS may store an ID of a tenant associated with the user in the audit information. The DMS may use this tenant information to filter audit reports by tenants, which may improve techniques for tenants to manage subtenants and corresponding users. For example, a higher-level tenant may request that the DMS display all stored audit information for users of one or more subtenants. The DMS may scan a database of previously obtained audit information and select the audit information that includes the tenant ID of the subtenant(s). The DMS may output the requested audit information for the subtenant after filtering the audit information database. The described techniques may thereby provide for the DMS to retrieve and provide audit information with improved reliability, security, and efficiency.

FIG. 1 illustrates an example of a computing environment 100 that supports access authorization for audit information in a multi-tenancy DMS in accordance with aspects of the present disclosure. The computing environment 100 may include a computing system 105, a DMS 110, and one or more computing devices 115, which may be in communication with one another via a network 120. The computing system 105 may generate, store, process, modify, or otherwise use associated data, and the DMS 110 may provide one or more data management services for the computing system 105. For example, the DMS 110 may provide a data backup service, a data recovery service, a data classification service, a data transfer or replication service, one or more other data management services, or any combination thereof for data associated with the computing system 105.

The network 120 may allow the one or more computing devices 115, the computing system 105, and the DMS 110 to communicate (e.g., exchange information) with one another. The network 120 may include aspects of one or more wired networks (e.g., the Internet), one or more wireless networks (e.g., cellular networks), or any combination thereof. The network 120 may include aspects of one or more public networks or private networks, as well as secured or unsecured networks, or any combination thereof. The network 120 also may include any quantity of communications links and any quantity of hubs, bridges, routers, switches, ports or other physical or logical network components.

A computing device 115 may be used to input information to or receive information from the computing system 105, the DMS 110, or both. For example, a user of the computing device 115 may provide user inputs via the computing device 115, which may result in commands, data, or any combination thereof being communicated via the network 120 to the computing system 105, the DMS 110, or both. Additionally or alternatively, a computing device 115 may output (e.g., display) data or other information received from the computing system 105, the DMS 110, or both. A user of a computing device 115 may, for example, use the computing device 115 to interact with one or more user interfaces (e.g., graphical user interfaces (GUIs)) to operate or otherwise interact with the computing system 105, the DMS 110, or both. Though one computing device 115 is shown in FIG. 1, it is to be understood that the computing environment 100 may include any quantity of computing devices 115.

A computing device 115 may be a stationary device (e.g., a desktop computer or access point) or a mobile device (e.g., a laptop computer, tablet computer, or cellular phone). In some examples, a computing device 115 may be a commercial computing device, such as a server or collection of servers. And in some examples, a computing device 115 may be a virtual device (e.g., a virtual machine). Though shown as a separate device in the example computing environment of FIG. 1, it is to be understood that in some cases a computing device 115 may be included in (e.g., may be a component of) the computing system 105 or the DMS 110.

The computing system 105 may include one or more servers 125 and may provide (e.g., to the one or more computing devices 115) local or remote access to applications, databases, or files stored within the computing system 105. The computing system 105 may further include one or more data storage devices 130. Though one server 125 and one data storage device 130 are shown in FIG. 1, it is to be understood that the computing system 105 may include any quantity of servers 125 and any quantity of data storage devices 130, which may be in communication with one another and collectively perform one or more functions ascribed herein to the server 125 and data storage device 130.

A data storage device 130 may include one or more hardware storage devices operable to store data, such as one or more hard disk drives (HDDs), magnetic tape drives, solid-state drives (SSDs), storage area network (SAN) storage devices, or network-attached storage (NAS) devices. In some cases, a data storage device 130 may comprise a tiered data storage infrastructure (or a portion of a tiered data storage infrastructure). A tiered data storage infrastructure may allow for the movement of data across different tiers of the data storage infrastructure between higher-cost, higher-performance storage devices (e.g., SSDs and HDDs) and relatively lower-cost, lower-performance storage devices (e.g., magnetic tape drives). In some examples, a data storage device 130 may be a database (e.g., a relational database), and a server 125 may host (e.g., provide a database management system for) the database.

A server 125 may allow a client (e.g., a computing device 115) to download information or files (e.g., executable, text, application, audio, image, or video files) from the computing system 105, to upload such information or files to the computing system 105, or to perform a search query related to particular information stored by the computing system 105. In some examples, a server 125 may act as an application server or a file server. In general, a server 125 may refer to one or more hardware devices that act as the host in a client-server relationship or a software process that shares a resource with or performs work for one or more clients.

A server 125 may include a network interface 140, processor 145, memory 150, disk 155, and computing system manager 160. The network interface 140 may enable the server 125 to connect to and exchange information via the network 120 (e.g., using one or more network protocols). The network interface 140 may include one or more wireless network interfaces, one or more wired network interfaces, or any combination thereof. The processor 145 may execute computer-readable instructions stored in the memory 150 in order to cause the server 125 to perform functions ascribed herein to the server 125. The processor 145 may include one or more processing units, such as one or more central processing units (CPUs), one or more graphics processing units (GPUs), or any combination thereof. The memory 150 may comprise one or more types of memory (e.g., random access memory (RAM), static random access memory (SRAM), dynamic random access memory (DRAM), read-only memory ((ROM), electrically erasable programmable read-only memory (EEPROM), Flash, etc.). Disk 155 may include one or more HDDs, one or more SSDs, or any combination thereof. Memory 150 and disk 155 may comprise hardware storage devices. The computing system manager 160 may manage the computing system 105 or aspects thereof (e.g., based on instructions stored in the memory 150 and executed by the processor 145) to perform functions ascribed herein to the computing system 105. In some examples, the network interface 140, processor 145, memory 150, and disk 155 may be included in a hardware layer of a server 125, and the computing system manager 160) may be included in a software layer of the server 125. In some cases, the computing system manager 160 may be distributed across (e.g., implemented by) multiple servers 125 within the computing system 105.

In some examples, the computing system 105 or aspects thereof may be implemented within one or more cloud computing environments, which may alternatively be referred to as cloud environments. Cloud computing may refer to Internet-based computing, wherein shared resources, software, and/or information may be provided to one or more computing devices on-demand via the Internet. A cloud environment may be provided by a cloud platform, where the cloud platform may include physical hardware components (e.g., servers) and software components (e.g., operating system) that implement the cloud environment. A cloud environment may implement the computing system 105 or aspects thereof through Software-as-a-Service (SaaS) or Infrastructure-as-a-Service (IaaS) services provided by the cloud environment. SaaS may refer to a software distribution model in which applications are hosted by a service provider and made available to one or more client devices over a network (e.g., to one or more computing devices 115 over the network 120). IaaS may refer to a service in which physical computing resources are used to instantiate one or more virtual machines, the resources of which are made available to one or more client devices over a network (e.g., to one or more computing devices 115 over the network 120).

In some examples, the computing system 105 or aspects thereof may implement or be implemented by one or more virtual machines. The one or more virtual machines may run various applications, such as a database server, an application server, or a web server. For example, a server 125 may be used to host (e.g., create, manage) one or more virtual machines, and the computing system manager 160 may manage a virtualized infrastructure within the computing system 105 and perform management operations associated with the virtualized infrastructure. The computing system manager 160 may manage the provisioning of virtual machines running within the virtualized infrastructure and provide an interface to a computing device 115 interacting with the virtualized infrastructure. For example, the computing system manager 160 may be or include a hypervisor and may perform various virtual machine-related tasks, such as cloning virtual machines, creating new virtual machines, monitoring the state of virtual machines, moving virtual machines between physical hosts for load balancing purposes, and facilitating backups of virtual machines. In some examples, the virtual machines, the hypervisor, or both, may virtualize and make available resources of the disk 155, the memory, the processor 145, the network interface 140, the data storage device 130, or any combination thereof in support of running the various applications. Storage resources (e.g., the disk 155, the memory 150, or the data storage device 130) that are virtualized may be accessed by applications as a virtual disk.

The DMS 110 may provide one or more data management services for data associated with the computing system 105 and may include DMS manager 190 and any quantity of storage nodes 185. The DMS manager 190 may manage operation of the DMS 110, including the storage nodes 185. Though illustrated as a separate entity within the DMS 110, the DMS manager 190 may in some cases be implemented (e.g., as a software application) by one or more of the storage nodes 185. In some examples, the storage nodes 185 may be included in a hardware layer of the DMS 110, and the DMS manager 190 may be included in a software layer of the DMS 110. In the example illustrated in FIG. 1, the DMS 110 is separate from the computing system 105 but in communication with the computing system 105 via the network 120. It is to be understood, however, that in some examples at least some aspects of the DMS 110 may be located within computing system 105. For example, one or more servers 125, one or more data storage devices 130, and at least some aspects of the DMS 110 may be implemented within the same cloud environment or within the same data center.

Storage nodes 185 of the DMS 110 may include respective network interfaces 165, processors 170, memories 175, and disks 180. The network interfaces 165 may enable the storage nodes 185 to connect to one another, to the network 120, or both. A network interface 165 may include one or more wireless network interfaces, one or more wired network interfaces, or any combination thereof. The processor 170 of a storage node 185 may execute computer-readable instructions stored in the memory 175 of the storage node 185 in order to cause the storage node 185 to perform processes described herein as performed by the storage node 185. A processor 170 may include one or more processing units, such as one or more CPUs, one or more GPUs, or any combination thereof. The memory 150 may comprise one or more types of memory (e.g., RAM, SRAM, DRAM, ROM, EEPROM, Flash, etc.). A disk 180 may include one or more HDDs, one or more SDDs, or any combination thereof. Memories 175 and disks 180 may comprise hardware storage devices. Collectively, the storage nodes 185 may in some cases be referred to as a storage cluster or as a cluster of storage nodes 185.

The DMS 110 may provide a backup and recovery service for the computing system 105. For example, the DMS 110 may manage the extraction and storage of snapshots 135 associated with different point-in-time versions of one or more target data sources within the computing system 105. A snapshot 135 of a data source (e.g., a virtual machine, a database, a filesystem, a virtual disk, a virtual desktop, or other type of computing system or storage system) may be a file (or set of files) that represents a state of the data source (e.g., the data thereof) as of a particular point in time. A snapshot 135 may also be used to restore (e.g., recover) the corresponding data source as of the particular point in time corresponding to the snapshot 135. A data source of which a snapshot 135 may be generated may be referred to as snappable. Snapshots 135 may be generated at different times (e.g., periodically or on some other scheduled or configured basis) in order to represent the state of the computing system 105 or aspects thereof as of those different times. In some examples, a snapshot 135 may include metadata that defines a state of the data source as of a particular point in time. For example, a snapshot 135 may include metadata associated with (e.g., that defines a state of) some or all data blocks included in (e.g., stored by or otherwise included in) the data source. Snapshots 135 (e.g., collectively) may capture changes in the data blocks over time. Snapshots 135 generated for the target data sources within the computing system 105 may be stored in one or more storage locations (e.g., the disk 155, memory 150, the data storage device 130) of the computing system 105, in the alternative or in addition to being stored within the DMS 110, as described below.

To obtain a snapshot 135 of a target data source associated with the computing system 105 (e.g., of the entirety of the computing system 105 or some portion thereof, such as one or more databases, virtual machines, or filesystems within the computing system 105), the DMS manager 190 may transmit a snapshot request to the computing system manager 160. In response to the snapshot request, the computing system manager 160 may set the target data source into a frozen state (e.g. a read-only state). Setting the target data source into a frozen state may allow a point-in-time snapshot 135 of the target data source to be stored or transferred.

In some examples, the computing system 105 may generate the snapshot 135 based on the frozen state of the data source. For example, the computing system 105 may execute an agent of the DMS 110 (e.g., the agent may be software installed at and executed by one or more servers 125), and the agent may cause the computing system 105 to generate the snapshot 135 and transfer the snapshot to the DMS 110 in response to the request from the DMS 110. In some examples, the computing system manager 160 may cause the computing system 105 to transfer, to the DMS 110, data that represents the frozen state of the target data source, and the DMS 110 may generate a snapshot 135 of the target data source based on the corresponding data received from the computing system 105.

Once the DMS 110 receives, generates, or otherwise obtains a snapshot 135, the DMS 110 may store the snapshot 135 at one or more of the storage nodes 185. The DMS 110 may store a snapshot 135 at multiple storage nodes 185, for example, for improved reliability. Additionally or alternatively, snapshots 135 may be stored in some other location connected with the network 120. For example, the DMS 110 may store more recent snapshots 135 at the storage nodes 185, and the DMS 110 may transfer less recent snapshots 135 via the network 120 to a cloud environment (which may include or be separate from the computing system 105) for storage at the cloud environment, a magnetic tape storage device, or another storage system separate from the DMS 110.

Updates made to a target data source that has been set into a frozen state may be written by the computing system 105 to a separate file (e.g., an update file) or other entity within the computing system 105 while the target data source is in the frozen state. After the snapshot 135 (or associated data) of the target data source has been transferred to the DMS 110, the computing system manager 160 may release the target data source from the frozen state, and any corresponding updates written to the separate file or other entity may be merged into the target data source.

In response to a restore command (e.g., from a computing device 115 or the computing system 105), the DMS 110 may restore a target version (e.g., corresponding to a particular point in time) of a data source based on a corresponding snapshot 135 of the data source. In some examples, the corresponding snapshot 135 may be used to restore the target version based on data of the data source as stored at the computing system 105 (e.g., based on information included in the corresponding snapshot 135 and other information stored at the computing system 105, the data source may be restored to its state as of the particular point in time). Additionally or alternatively, the corresponding snapshot 135 may be used to restore the data of the target version based on data of the data source as included in one or more backup copies of the data source (e.g., file-level backup copies or image-level backup copies). Such backup copies of the data source may be generated in conjunction with or according to a separate schedule than the snapshots 135. For example, the target version of the data source may be restored based on the information in a snapshot 135 and based on information included in a backup copy of the target object generated prior to the time corresponding to the target version. Backup copies of the data source may be stored at the DMS 110 (e.g., in the storage nodes 185) or in some other location connected with the network 120 (e.g., in a cloud environment, which in some cases may be separate from the computing system 105).

In some examples, the DMS 110 may restore the target version of the data source and transfer the data of the restored data source to the computing system 105. And in some examples, the DMS 110 may transfer one or more snapshots 135 to the computing system 105, and restoration of the target version of the data source may occur at the computing system 105 (e.g., as managed by an agent of the DMS 110, where the agent may be installed and operate at the computing system 105).

In response to a mount command (e.g., from a computing device 115 or the computing system 105), the DMS 110 may instantiate data associated with a point-in-time version of a data source based on a snapshot 135 corresponding to the data source (e.g., along with data included in a backup copy of the data source) and the point-in-time. The DMS 110 may then allow the computing system 105 to read or modify the instantiated data (e.g., without transferring the instantiated data to the computing system). In some examples, the DMS 110 may instantiate (e.g., virtually mount) some or all of the data associated with the point-in-time version of the data source for access by the computing system 105, the DMS 110, or the computing device 115.

In some examples, the DMS 110 may store different types of snapshots, including for the same data source. For example, the DMS 110 may store both base snapshots 135 and incremental snapshots 135. A base snapshot 135 may represent the entirety of the state of the corresponding data source as of a point in time corresponding to the base snapshot 135. An incremental snapshot 135 may represent the changes to the state-which may be referred to as the delta—of the corresponding data source that have occurred between an earlier or later point in time corresponding to another snapshot 135 (e.g., another base snapshot 135 or incremental snapshot 135) of the data source and the incremental snapshot 135. In some cases, some incremental snapshots 135 may be forward-incremental snapshots 135 and other incremental snapshots 135 may be reverse-incremental snapshots 135. To generate a full snapshot 135 of a data source using a forward-incremental snapshot 135, the information of the forward-incremental snapshot 135 may be combined with (e.g., applied to) the information of an earlier base snapshot 135 of the data source along with the information of any intervening forward-incremental snapshots 135, where the earlier base snapshot 135 may include a base snapshot 135 and one or more reverse-incremental or forward-incremental snapshots 135. To generate a full snapshot 135 of a data source using a reverse-incremental snapshot 135, the information of the reverse-incremental snapshot 135 may be combined with (e.g., applied to) the information of a later base snapshot 135 of the data source along with the information of any intervening reverse-incremental snapshots 135.

In some examples, the DMS 110 may provide a data classification service, a malware detection service, a data transfer or replication service, backup verification service, or any combination thereof, among other possible data management services for data associated with the computing system 105. For example, the DMS 110 may analyze data included in one or more data sources of the computing system 105, metadata for one or more data sources of the computing system 105, or any combination thereof, and based on such analysis, the DMS 110 may identify locations within the computing system 105 that include data of one or more target data types (e.g., sensitive data, such as data subject to privacy regulations or otherwise of particular interest) and output related information (e.g., for display to a user via a computing device 115). Additionally or alternatively, the DMS 110 may detect whether aspects of the computing system 105 have been impacted by malware (e.g., ransomware). Additionally or alternatively, the DMS 110 may relocate data or create copies of data based on using one or more snapshots 135 to restore the associated data source within its original location or at a new location (e.g., a new location within a different computing system 105). Additionally or alternatively, the DMS 110 may analyze backup data to ensure that the underlying data (e.g., user data or metadata) has not been corrupted. The DMS 110 may perform such data classification, malware detection, data transfer or replication, or backup verification, for example, based on data included in snapshots 135 or backup copies of the computing system 105, rather than live contents of the computing system 105, which may beneficially avoid adversely affecting (e.g., infecting, loading, etc.) the computing system 105.

In some examples, the DMS 110 may be a multi-tenancy DMS 110 that may provide backup services for multiple tenants (e.g., organizations or business units). The tenants may be organized into a hierarchy of tenants. For example, resources of the DMS 110 may be shared among multiple higher-level tenants, and at least some of the higher-level tenants may be associated with one or more levels of lower-level tenants (e.g., subtenants), with resources associated with a higher-level tenant being shared by multiple subtenants of that tenant. The DMS 110 may obtain and store audit information for users of the system. For example, the DMS 110 may generate audit information when a user logs in to the DMS 110 and may update the audit information to indicate operations (e.g., audit events) performed by the user when logged in to the DMS 110 or otherwise associated with the user. The DMS 110 may store the audit information in a storage node 185 of the DMS 110, or some other location in the computing environment 100.

Techniques, systems, and devices described herein provide for the DMS 110 or a central manager of the DMS 110 to determine whether a first user that requests access to audit information for a second user of a multi-tenant system has permission to access the audit information associated with the second user, while accounting for impacts of a multi-level hierarchical multi-tenancy environment. The first user may be, for example, an administrator of a tenant that wants to review operations performed by the second user. The DMS 110 may determine whether to grant the first user access to the audit information based on an authentication domain that is assigned to a tenant to which the first user has access. For example, the DMS 110 may assign authentication domains to one or more tenants of the multi-tenant system. An authentication domain may include one or more subtenants, groups, or users that the tenant has authorization over. If the second user is within an authentication domain that has been assigned to the tenant associated with the first user (e.g., the tenant has authorization over the second user), the first user may have permission to access the audit information for the second user. The DMS 110 may determine an ID of the tenant to which the first user has access based on the context for a log-in session for the first user. Thus, the DMS 110 may provide the first user access to the audit information if the tenant of the first user has authorization over the second user, and the DMS 110 may refrain from providing the audit information otherwise.

In some examples, when generating an audit report for a given user, the DMS 110 may store an ID of a tenant associated with the user in the audit information at a storage node 185 or other storage location. The DMS 110 may use this tenant information to filter audit reports by tenants, which may improve techniques for tenants to manage subtenants and corresponding users. For example, a higher-level tenant may request that the DMS 110 display all stored audit information for users of a subtenant. The DMS 110 may scan a database of previously obtained audit information and select the audit information that includes the tenant ID of the subtenant. The DMS 110 may output the requested audit information for the subtenant after filtering the audit information database. The described techniques may thereby provide for the DMS 110 to retrieve and provide audit information with improved reliability, security, and efficiency.

Figure 2:
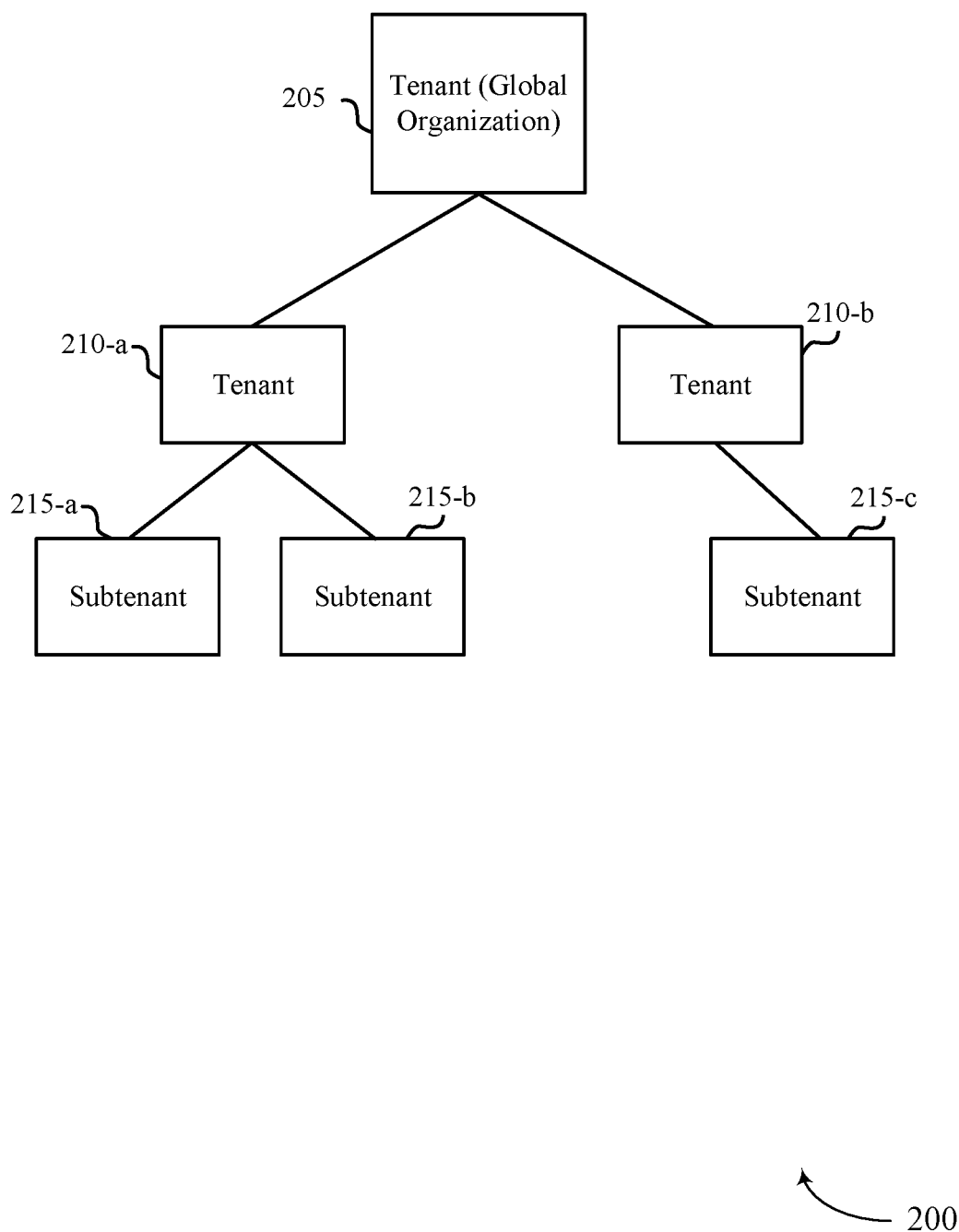
FIG. 2 illustrates an example of a multi-tenancy system that supports access authorization for audit information in a multi-tenancy DMS in accordance with aspects of the present disclosure.

FIG. 2 illustrates an example of a multi-tenancy system 200 that supports access authorization for audit information in a multi-tenancy DMS in accordance with aspects of the present disclosure. The multi-tenancy system 200 may implement or be implemented by aspects of the computing environment 100 described with reference to FIG. 1. For example, a DMS 110 may provide backup and recovery protection for data sources for multiple tenants and/or subtenants.

As described herein, a global organization (e.g., a tenant 205) may provide IT services, including backup and recovery protection via a DMS 110, to multiple tenants (e.g., tenant 210-a and tenant 210-b). Additionally, each tenant may further have subtenants. For example, the tenant 210-a may have a subtenant 215-a and a subtenant 215-b. For example, the tenant 205 may be the IT services unit of an organization, and the tenant 210-a and the tenant 210-b may be business units of or teams within the organization. The subtenant 215-a and the subtenant 215-b may be sub-business units or sub-teams of the business unit corresponding to the tenant 210-a (e.g., working groups within the business unit). The subtenant 215-c similarly may be a sub-business unit or sub-teams of the business unit corresponding to the tenant 210-b. As another example, the tenant 205 may be an MSP, and the tenant 210-a and the tenant 210-b may be different enterprises/customers (e.g., organizations) of the MSP. The subtenant 215-a, the subtenant 215-b, and the subtenant 215-c may be business units and/or working groups/entities/teams of the enterprises/customers corresponding to the tenant 210-a and the tenant 210-b.

In some examples, the tenant 205 corresponds to a DMS 110 that controls backup and recovery resources that are used to provide backup and recovery protection to the various tenants 210-a and subtenants 215 of the organization. An administrative user of the tenant 205 may access the DMS 110 to configure and allocate resources (e.g., computing objects) that are used to support backup and recovery for data sources associated with the various tenants and subtenants. For example, the user may access a user interface of the DMS 110 to create the tenants 210-a and 210-b and to assign the respective backup and recovery resources to the created tenants 210-a and 210-b. Assignment of resources to a tenant may include updating metadata (e.g., RBAC metadata) associated with the respective resources to indicate respective tenant or subtenant assignments. In some cases, the administrative user may assign, to a tenant or subtenant using the user interface of the DMS 110, a data source that is to be backed-up using a respective resource, a backup or recovery procedure that may be performed using the respective resource, and/or a storage capacity for the backup and recovery resource. Assignment of a data source, procedure, or capacity may include updating the metadata (e.g., RBAC metadata) associated with the backup and recovery resource (e.g., computing object) that is to be used by the tenant or subtenant.

In some cases, the administrative user may access the user interface of the DMS 110 to assign users to the tenants 210 or subtenants 215. For example, the administrative user of the tenant 205 may assign a second administrative user to the tenant 210-a such that the second administrative user may access the platform for backup and recovery management, as well as further subtenant creation and resource assignment, data source assignment, procedure assignment, and capacity assignment. A third demonstrative user may be similarly assigned to the tenant 210-b. User assignment may be restricted or controlled based on hierarchical techniques, as described herein with respect to computing object assignment.

As described herein, users may access a user interface associated with the DMS 110 to control various backup and recovery aspects related to a tenant 205 or 210 or subtenant 215. In some examples, the user interface may be supported by a platform or application that is used to manage multiple DMSs 110, multiple tenants 205, subtenants 215, etc. In some examples, an authorized user may access the platform or application to control backup and recovery procedures, as well as tenant or subtenant creation and assignment. Each tenant 205 or 210 or subtenant 215 may be associated with a "context" of the platform or application. An application context refers to a state of an application that allows a user to manage to control aspects of backup and recovery associated with a particular tenant 205 or 210 or subtenant 215. Thus, a user may access an application context associated with the tenant 210-a and the user may view resources, procedures, etc. that are assigned to the tenant 210-a as well as create subtenants of the tenant 210-a (e.g. subtenants 215-a and 215-b) and assign subsets of resources to the created subtenants. Thus, when discussing a user accessing a user interface of the DMS 110 herein, the user may access the application context associated with a tenant or subtenant to perform various functions and procedures described herein.

As described herein, the DMS 110 may provide for an RBAC scheme such that users associated with each tenant/subtenant may access only the computing objects assigned to the given tenant/subtenant. Accordingly, the tenants 210 and subtenants 215 may share a single DMS 110 and/or a single data management cluster without unauthorized access by any tenant 210) or subtenant 215 to computing objects or files assigned to a different tenant 210 or subtenant 215. For example, one business unit of an enterprise may not access computing objects or files assigned to a different business unit of the enterprise. As another example, one customer of an MSP may not access computing objects or files assigned to a different customer of the MSP.

In accordance with aspects of the present disclosure, the DMS 110 may receive, at a user interface associated with the DMS 110, a request, by a user of a tenant 210 of the DMS 110, to access audit information associated with another entity of the DMS 110. The other entity may be a subject of the audit information (e.g., an entity that performed the audit event, such as a user) or an object of the audit information (e.g., an entity that is the target of the audit event, such as a user or a computing object, or some other entity). The DMS 110 may determine whether the user that requests access to the audit information for an entity of the multi-tenancy system 200 has permission to access the audit information associated with the entity, while accounting for impacts of a multi-level hierarchical multi-tenancy system 200. The user may be, for example, an administrator of a tenant 210 that wants to review operations performed by a second user or operations performed on a second user or a set of one or more computing objects.

In some examples, the DMS 110 may determine whether to grant the user access to the audit information based on an authentication domain that is assigned to a tenant 210 to which the user has access. For example, the DMS 110 may assign authentication domains to one or more tenants 210 of the multi-tenancy system 200. An authentication domain may include one or more subtenants 215, user groups, or users that the tenant 210 has authorization over, as described in further detail elsewhere herein, including with reference to FIG. 4. If the user requests to view audit information associated with a second user, and the second use is within an authentication domain that has been assigned to the tenant 210) associated with the user, such as the tenant 210-a, the user may have permission to access the audit information for the second user. The DMS 110 may determine an ID of the tenant 210-a to which the user has access based on the context for a log-in session for the user. In some examples, the DMS 110 may determine whether to grant the user access to the audit information based on a set of computing objects to which the tenant 210 to which the user has access is assigned or authorized to access, as described in further detail elsewhere herein, including with reference to FIG. 3. Thus, the DMS 110 may provide the user access to the audit information if the tenant 210 of the user has authorization over or access to the entity of the requested audit information, and the DMS 110 may refrain from providing the audit information otherwise.

In some examples, when generating an audit report for a given user, the DMS 110 may store an ID of a tenant associated with the user in the audit information at a storage node or other storage location. The DMS 110 may use this tenant information to filter audit reports by tenants 210 or subtenants 215, which may improve techniques for tenants to manage subtenants 215 and corresponding users. For example, a higher-level tenant 210, such as the tenant 210-a, may request that the DMS 110 display all stored audit information for users of a subtenant 215, such as the subtenant 215-a. The DMS 110 may scan a database of previously obtained audit information and select the audit information that includes the tenant ID of the subtenant 215-a. The DMS 110 may output the requested audit information for the subtenant 215-a after filtering the audit information database. In some examples, the user of the tenant 210-a may request to view all audit information for a group or set of two or more subtenants 215 of the tenant 210-a, and the DMS 110 may filter the report data accordingly. The described techniques may thereby provide for the DMS 110 to retrieve and provide audit information with improved reliability, security, and efficiency.

Figure 3:
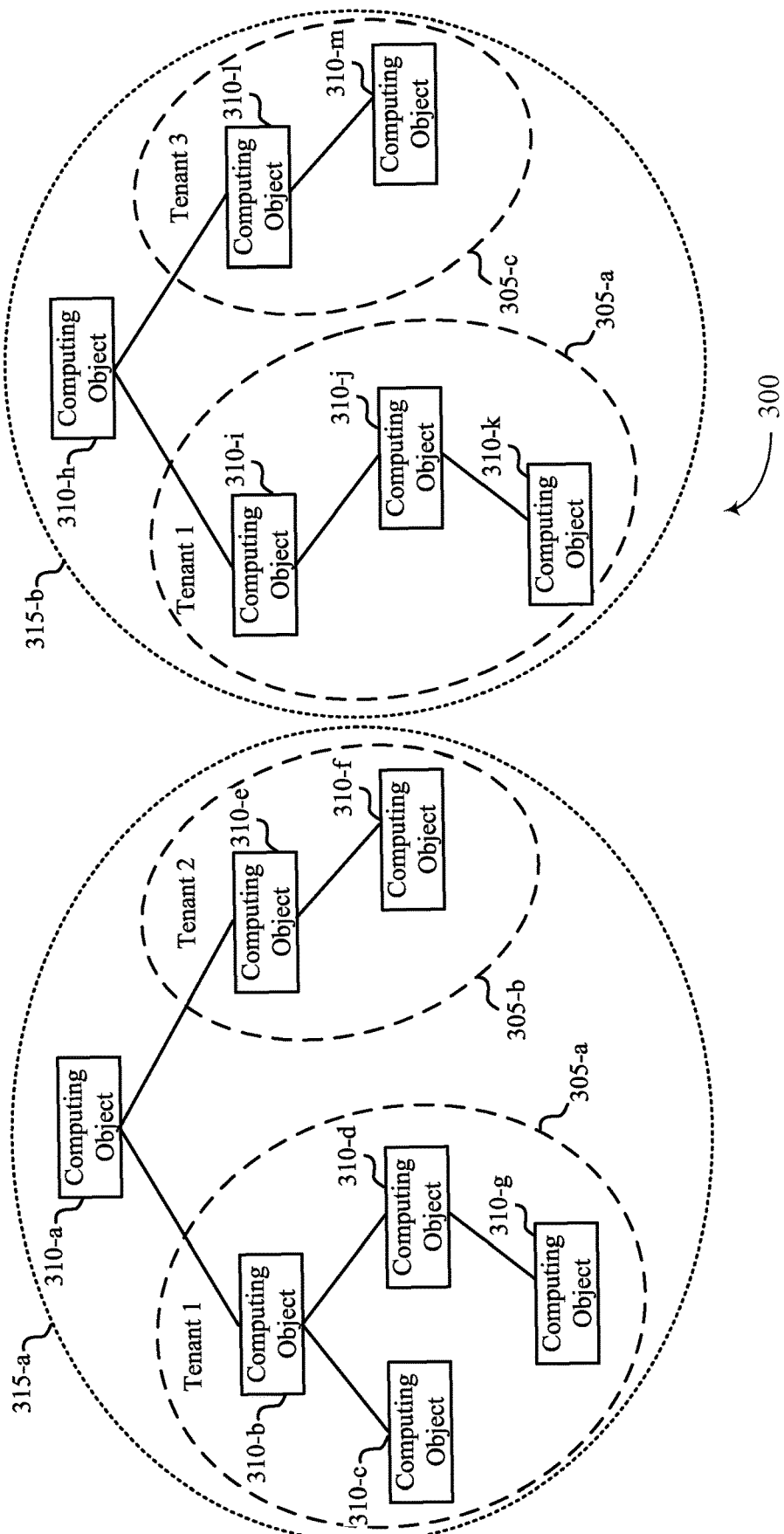
FIG. 3 illustrates an example of a computing object hierarchy that supports access authorization for audit information in a multi-tenancy DMS in accordance with aspects of the present disclosure.

FIG. 3 illustrates an example of computing object hierarchy 300 that supports access authorization for audit information in a multi-tenancy DMS in accordance with aspects of the present disclosure. The computing object hierarchy 300 may implement or be implemented by aspects of the computing environment 100 described with reference to FIG. 1. For example, a DMS 110 may provide backup and recovery protection for data sources for multiple tenants and/or subtenants via one or more data management clusters. For example, FIG. 3 illustrates a first data management cluster 315-a and a second data management cluster 315-b, which may provide protection for data sources associated with a first tenant 305-a, a second tenant 305-b, and a third tenant 305-c.

Each of the first data management cluster 315-a and the second data management cluster 315-b may include a set of computing objects (e.g., resources such as virtual machines or databases) which may be organized according to a hierarchical relationship. For example, the first data management cluster 315-a may include the computing object 310-a, which has as descendants the computing object 310-b and the computing object 310-e. The computing object 310-b has as descendants the computing object 310-c and the computing object 310-d, and the computing object 310-d further has as a descendant the computing object 310-g. The computing object 310-e has as a descendent the computing object 310-f.

The second data management cluster 315-b may include the computing object 310-h, which has as descendants the computing object 310-i and the computing object 310-l. The computing object 310-i has as a descendant the computing object 310-j, and the computing object 310-j further has as a descendant the computing object 310-k. The computing object 310-l has as a descendent the computing object 310-m.

As described herein, the multiple tenants (the first tenant 305-a, the second tenant 305-b, and the third tenant 305-c) may share data management resources. More specifically, multiple tenants of a DMS 110 may share computing objects 310 of a same data management clusters 315. For example, the first tenant 305-a and the second tenant 305-b may both be assigned computing objects 310 within the first data management cluster 315-a, and the first tenant 305-a and the third tenant 305-c may both be assigned computing objects 310 within the second data management cluster 315-b. The assignment of computing objects 310 of the data management clusters 315 may respect the hierarchical relationship among the computing objects 310. For example, assignment of a top-level computing object such as the computing object 310-b to the first tenant 305-a may result in assignment of (e.g., an implicit assignment of) the computing object 310-c, the computing object 310-d, and the computing object 310-g to the first tenant 305-a, as the computing object 310-c, the computing object 310-d, and the computing object 310-g are descendants of the computing object 310-b within the computing object hierarchy of the first data management cluster 315-a. Similarly, assignment of the computing object 310-e to the second tenant 305-b may result in assignment of the computing object 310-f to the second tenant 305-b. As another example, assignment of the computing object 310-i to the first tenant 305-a may result in assignment of the computing object 310-j and the computing object 310-k to the first tenant 305-a. As another example, assignment of the computing object 310-l to the third tenant 305-c may result in assignment of the computing object 310-m to the third tenant 305-c. Such implicit assignment of resources based on the computing object hierarchy may simplify management of the DMS 110 for an administrator (e.g., an IT services unit or an MSP). For example, an MSP may assign a full data management cluster 315 to a tenant to achieve assignment of all backup computing objects from that data management cluster 315 to the tenant. As another example, an MSP may assign a Vcenter from a data management cluster 315 to assign all of the virtual machines from that Vcenter to the tenant.

As described herein, the DMS 110 may provide for a multi-tenancy RBAC scheme such that users associated with each tenant/subtenant may access only the computing objects assigned to the given tenant/subtenant. Multi-tenancy RBAC supports in-depth computing object level access control granularity for data management systems such as the DMS 110 with multiple data management clusters. Multi-tenancy RBAC supports both authorizing a full data management cluster 315 to a tenant (e.g., assigning all of the computing objects 310 of a given data management cluster 315 to a given tenant), and assignment of specific computing objects 310 of a data management cluster 315 to a given tenant. A user associated with the first tenant 305-a may not access computing objects assigned to the second tenant 305-b or the third tenant 305-c, a user associated with the second tenant 305-b may not access computing objects assigned to the first tenant 305-a or the third tenant 305-c, and a user associated with the third tenant 305-c may not access computing objects assigned to the first tenant 305-a or the second tenant 305-*b*. For example, a tenant dashboard (e.g., a user interface view for a tenant account at a computing device 115) may show relevant statistics and information regarding authorized computing objects 310 for that tenant, and the tenant may only manage data backup for the authorized computing objects 310. The multi-tenancy RBAC may prevent information leakage across tenants via enforcing access control at all user interfaces, events, audits, reports, etc., for a tenant, such that a tenant is not able to view or access direct or aggregated information about computing objects 310 that are not assigned to that tenant. A tenant may not bypass the access control enforcement in either the control plane or the cluster side via federated login.

As an example, an MSP account with multiple cloud accounts or on-premise data management clusters (e.g., the first data management cluster 315-*a* may be a first cloud account or on-premise data management cluster of the MSP and the second data management cluster 315-*b* may be a second cloud account or on-premise data management cluster of the MSP), and the MSP may assign a specific computing object 310 within the multiple cloud accounts or on-premise data management clusters of the MSP to a given tenant (e.g., customer) of the MSP. Further, multi-tenancy RBAC may authorize different permissions (e.g., read-only, read-write) on different computing objects 310. For example, a tenant (e.g., the first tenant 305-*a*) may have read-only access to a virtual machine (e.g., the computing object 310-*c*) but read-write access to a MSSQL database (e.g., the computing object 310-*d*).

Techniques, systems, and devices described herein provide for the DMS 110 to determine whether a user has permission to access audit information associated with a given entity based on the tenant 305 associated with a given log-in session by the user. As described in further detail elsewhere herein, including with reference to FIG. 5, a DMS 110 may obtain and store audit information to track an audit event. The audit event may correspond to an operation performed by a user of the DMS 110. The user that performs the operation may be referred to as a subject of the audit event and the entity on which the operation is being performed may be referred to as an object of the audit event, in some examples described herein. For example, if a user (UserA) updates one or more settings associated with a computing object 310 (e.g., a vCenter) of the DMS 110, the DMS 110 may store audit information that includes a record of the operations performed by the user (e.g., the subject) on the computing object 310 (e.g., the object). If a first user (UserA) resets one or more configuration settings (e.g., a multi-factor authentication (MFA)) for a second user (UserB) of the DMS 110, the DMS 110 may store audit information that includes a record of the operations performed by the first user (e.g., the subject) on the second user (e.g., the object). Access control for audit information may be performed, by the DMS 110, based on the subject of an audit event, an object of the audit event, or both.

In some examples, if the access control is performed at least in part based on an object of an audit event, and the object is a computing object 310, the DMS 110 may utilize the computing object hierarchy 300 to facilitate the access control. For example, if the DMS 110 receives a request to access audit information associated with audit events performed on one or more computing objects 310, the DMS 110 may determine context information associated with a log-in session of a user that sent the request. The context information may indicate a tenant ID of a tenant 305 to which the user is logged in. The DMS 110 may determine authorization information that indicates a relationship between the tenant ID of the tenant 305 and the one or more computing objects 310 associated with the requested audit information. If the one or more computing objects 310 are included in or below a set of computing objects 310 to which the tenant 305 associated with the request has access in the computing object hierarchy 300, the DMS 110 may determine to output the audit information to the user in response to the request. The DMS 110 may otherwise refrain from outputting the audit information to the user if the one or more computing objects 310 are not included in or below the set of computing objects 310 to which the tenant 305 associated with the request has access in the computing object hierarchy 300.

For example, if the user is signed in to the tenant 305-*a* and requests to view audit information associated with the computing objects 310-*e* and 310-*f*, the DMS 110 may refrain from outputting the requested audit information to the user, because the requested computing objects 310-*e* and 310-*f* may not be included in the set of computing objects 310-*b*, 310-*c*, 310-*d*, and 310-*g* to which the tenant 305-*a* has access in the computing objects hierarchy 300. If the user is signed into the tenant 305-*a* and requests to view audit information associated with the computing objects 310-*b* and 310-*c*, the DMS 110 may output the requested audit information to the user based on determining that the tenant 305-*a* is authorized to access the computing objects 310-*b* and 310-*c*.

The DMS 110 may thereby utilize the computing object hierarchy 300 to determine whether a user is authorized to access audit information associated with an audit event performed on one or more computing objects 310 (e.g., the object of the audit event). In some examples, the DMS 110 may perform access control based on the subject of audit information, or both the subject and the object, as described in further detail elsewhere herein, including with reference to FIGS. 4-6. The described techniques may thereby provide for the DMS 110 to retrieve and provide audit information with improved reliability, security, and efficiency.

Figure 4:
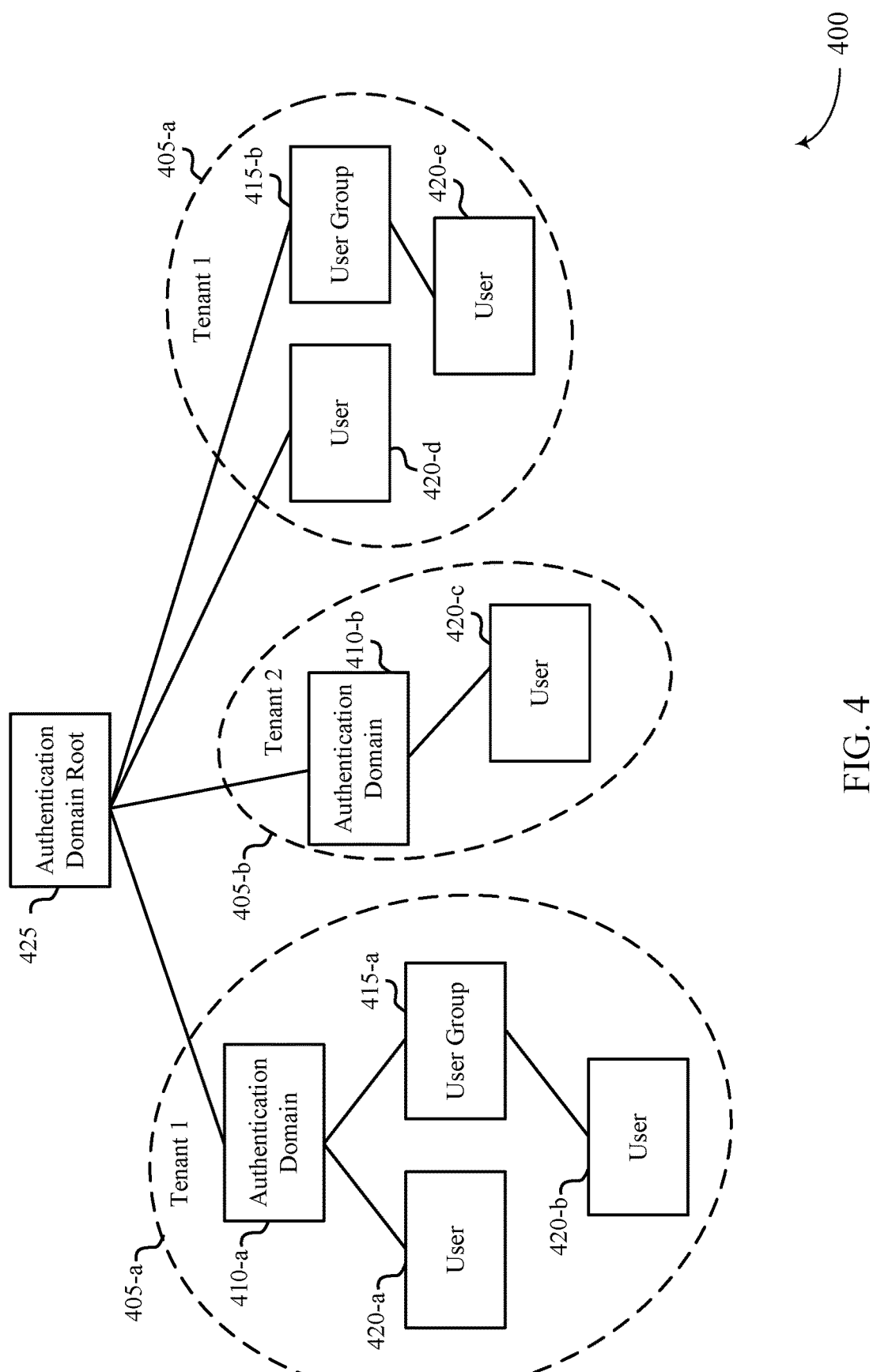
FIG. 4 illustrates an example of an authentication hierarchy that supports access authorization for audit information in a multi-tenancy DMS in accordance with aspects of the present disclosure.

FIG. 4 illustrates an example of an authentication hierarchy 400 that supports access authorization for audit information in a multi-tenancy DMS in accordance with aspects of the present disclosure. The authentication hierarchy 400 may implement or be implemented by aspects of the computing environment 100, the multi-tenancy system 200, or the computing object hierarchy 300, as described with reference to FIGS. 1-3. For example, the authentication hierarchy 400 indicates a hierarchy of authorization for access to users 420) and user groups 415 (e.g., groups of one or more users, tenants, or tenant organizations) within a multi-tenancy system. The multi-tenancy system may represent a system of multiple tenants supported by a DMS 110, and the multiple tenants may be organized within a tenant hierarchy, as described with reference to FIG. 2.

A user 420 of the DMS 110 may represent an administrator or other client user that logs in to the DMS 110 via a user interface. The user 420 may log in to the DMS 110 through a given tenant 405. For example, an employee of a company may represent an example of a user 420, and the company may represent an example of a tenant 405. The employee may log in to the DMS 110 via a user interface associated with the company. In some examples described herein, a user 420 may be referred to as an entity of the DMS 110.

The tenants 405 in the multi-tenancy system may obtain authority to access and manage one or more users 420 of the DMS. If a tenant 405 has authorization over a user 420 as described herein, the tenant 405 may be able to monitor and adjust one or more settings or parameters associated with the user 420. For example, a tenant 405 may be able to authorize a change of username and password for a user 420 to which the tenant 405 has access, or the tenant 405 may be able to monitor audit information associated with a user 420 to which the tenant 405 has access, or both. After a tenant 405 gains access to or authorization over a certain user 420, the tenant 405 may grant the user 420 with access to the tenant 405. For example, the tenant 405 may authorize the user 420 to perform actions inside the tenant 405 (e.g., via the log-in request of the user 420).

The authentication hierarchy 400 may represent a hierarchy of authorizations for tenants 405 to access and manage users 420. The nodes in the authentication hierarchy 400 may include users 420, user groups 415 of two or more users 420 (e.g., tenants 405 or subtenants), authentication domain roots 425, and authentication domains 410. If a tenant 405 is assigned to or has access to a node in the authentication hierarchy 400, the tenant 405 also has access to all nodes below that node in the authentication hierarchy 400. An authentication domain root 425 may represent a root of the authentication hierarchy (e.g., a highest node in the hierarchy). In some examples, a global organization (e.g., an MSP) may have access to the authentication domain root 425, and may thereby automatically have authorization to access all descendances (e.g., other nodes, such as authentication domains 410, users 420, user groups 415) below the authentication domain root 425. The authentication domain root 425 may be subdivided into one or more authentication domains 410. The assignment of different tenants 405 to different nodes in the authentication hierarchy 400 may be managed and performed by the DMS 110, one or more higher level tenants 405 or global organizations, or both.

A tenant 405 within the multi-tenancy system may have access to or may be assigned to one or more different authentication domains 410. As used herein, an authentication domain 410 may represent a domain (e.g., a single sign-on (SSO) domain, or some other type of domain), of users 420 that follow the same authentication methods (e.g., password-based authentication, SSO, lightweight directory access protocol (LDAP), or any other type of authentication method). A tenant 405 may have authorization over all users within a given authentication domain 410. Additionally, or alternatively, the tenant 405 may be provided authorization over a single user 420 or a user group 415. A user group 415 may represent a group of one or more users 420.

In the example of FIG. 4, a first tenant 405-*a* (Tenant 1) may have access to the authentication domain 410-*a*. The first tenant 405-*a* may thereby have access to each node below the authentication domain 410-*a* in the authentication hierarchy 400. For example, the first tenant 405-*a* may have access to the user 420-*a* and the user group 415, which may include at least the user 420-*b*. The user 420-*a* and the user group 415 may be within a same domain (e.g., an SSO domain or some other type of domain), which may be linked to the authentication domain 410-*a*. Thus, the first tenant 405-*a* may have access to all users in the domain.

A second tenant 405-*b* (Tenant 2) may have access to the authentication domain 410-*b*. The second tenant 405-*b* may thereby have access to each node below the authentication domain 410-*b* in the authentication hierarchy 400. In the example of FIG. 4, the authentication domain 410-*b* may include a single user 420-*c*. Thus, the second tenant 405-*b* may have access to the user 420-*c*.

In some examples, a tenant 405 may have access directly to a single user 420 or to a single user group 415 (e.g., user groups 415-*a* or 415-*b*). For example, the first tenant 405-*a* may have access to the authentication domain 410-*a* and at least two other nodes in the authentication hierarchy 400. The first tenant 405-*a* may have access to the user 420-*d* and the user group 415-*b*. The first tenant 405-*a* may thereby have direct authorization over the user 420-*d* and the user group 415-*b* without an authorization domain. The user 420-*e* may be assigned to or below the user group 415-*b* in the authentication hierarchy. Accordingly, the first tenant 405-*a* may automatically have access to the user 420-*e* based on being assigned to the user group 415-*b*.

Although the tenants 405-*a* and 405-*b* are shown as having access to different authentication domains 410 in FIG. 4, it is to be understood that, in some cases, more than one tenant 405 may be assigned to a same authentication domain 410. The authentication hierarchy 400 may include any quantity of nodes and any quantity of levels. For example, a third tenant (not pictured in FIG. 4) may have access to just the user 420-*b* or to another authentication domain below the authentication domain 410-*a*, or both.

The authentication hierarchy 400 may be different than a hierarchy of tenants 405 within the multi-tenancy system, such as the hierarchy illustrated in the multi-tenancy system 200 described with reference to FIG. 2. For example, even if the first tenant 405-*a* is higher than the second tenant 405-*b* in the tenant hierarchy, the first tenant 405-*a* may not necessarily or automatically have access to users 420 of the second tenant 405-*b* that is assigned to or lower than the first tenant 405-*a* in the tenant hierarchy. Additionally, or alternatively, the second tenant 405-*b* may not necessarily or automatically have access to users 420 of the first tenant 405-*a* that is higher than the second tenant 405-*b* in the tenant hierarchy. Rather, access authorization may be determined based on which nodes the tenants 405 are assigned to in the authentication hierarchy 400. In some aspects, one or more objects or other entities may be included in the authentication hierarchy 400.

Techniques, systems, and devices described herein provide for a DMS 110 to utilize the authentication hierarchy 400, as well as tenant information stored with audit information at the DMS 110, to authorize access requests for authorization information. If the DMS 110 receives a request for a first user 420 to access audit information associated with a second user 420, the DMS 110 may determine whether the first user 420 is authorized to access the second user 420 before outputting the audit information, which may improve security and reliability in the multi-tenancy system. The access control for audit information may be performed based on a subject or object of an audit event. That is, the second user 420 may be the subject of the audit event (e.g., the performer) or the object of the audit event (e.g., the target of the audit event).

In the example of FIG. 4, the first tenant 405-*a* may be authorized to access audit information of both the user 420-*a* and the user 420-*b*. In some examples, the user 420-*a* may be logged in to the DMS 110 through the first tenant 405-*a* (e.g., the user 420-*a* may have authorization to access the first tenant 405-*a*) and the user 420-*b* may be logged in to the DMS 110 through a different tenant 405 (e.g., the user 420-*b* may have authorization to access a third tenant 405 not pictured in FIG. 4). If the user 420-*a* is logged in to the DMS 110 through the first tenant 405-*a* and outputs a request to the DMS 110 to access audit information for the user 420-*b* and the user group 415-*b*, the DMS 110 may determine that the user 420-*a* is authorized to access the audit information for the user 420-*b* and the user group 415-*b* and may output the requested audit information accordingly. For example, the DMS 110 may determine, based on context information for the log-in session associated with the user 420-*a*, that the user 420-*a* is associated with the first tenant 405-*a*. The DMS 110 may subsequently scan the authentication hierarchy 400 to determine a hierarchical relationship, in the authentication hierarchy 400, between the first tenant 405-*a* and the requested entities, including the user 420-*b* and the user group 415-*b*. The hierarchical relationship may indicate that the user 420-*b* is below an authentication domain 410-*a* to which the first tenant 405-*a* is assigned and the user group 415-*b* is assigned to the first tenant 405-*a* in the authentication hierarchy 400. The DMS 110 may output the audit information accordingly.

If the user 420-*a* requests to access audit information associated with the user 420-*c*, the DMS 110 may determine that the tenant 405-*a* is not authorized to access the user 420-*c* or the authentication domain 410-*b* in the authentication hierarchy 400, and the DMS 110 may refrain from outputting the audit information accordingly.

The multi-tenancy DMS 110 described herein may thereby utilize an authentication hierarchy 400 (e.g., a table of information, pointers, or other authorization information) to determine whether a user 420 of the DMS 110 is authorized to access audit information and other data associated with other users 420 of the DMS 110. Techniques for authorizing access to audit information are described in further detail elsewhere herein, including with reference to FIGS. 4-6.

Figure 5:
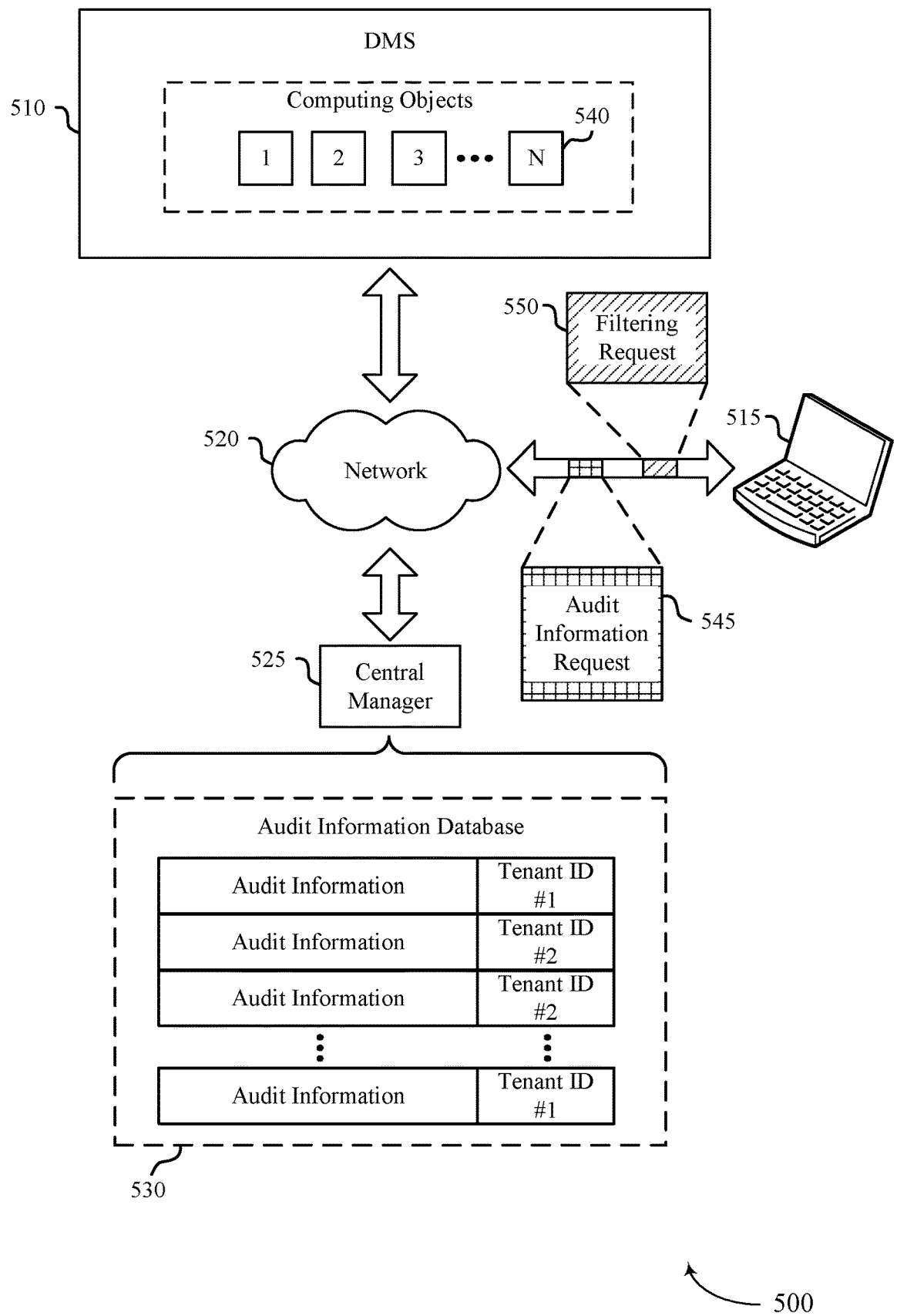
FIG. 5 illustrates an example of a computing environment that supports access authorization for audit information in a multi-tenancy DMS in accordance with aspects of the present disclosure.

FIG. 5 illustrates an example of a computing environment 500 that supports access authorization for audit information in a multi-tenancy DMS in accordance with aspects of the present disclosure. The computing environment 500 may implement or be implemented by aspects of the computing environment 100, the multi-tenancy system 200, and the authentication hierarchy 400 described with reference to FIGS. 1-3. For example, the computing environment 500 includes a DMS 510 and a computing device 515, which may be in communication with one another via a network 520, as described with reference to FIG. 1. The DMS 510 may provide backup services for multiple tenants (e.g., organizations or business units). The tenants of the DMS 510 may be organized in a hierarchical structure, as described with reference to FIG. 2. In this example, the DMS 510 may determine whether a first user has permission to access authorization information for another entity (e.g., a user or computing object 540) based on a tenant associated with a log-in session by the first user, while accounting for impacts of a multi-level hierarchical multi-tenancy environment.

The DMS 510 may provide backup services for data sources of multiple tenants. The data sources that are to be backed up may be stored within one or more computing systems 105 (not pictured in FIG. 5). The DMS 510 may include or be coupled with a central manager 525. The central manager 525 may be a component of the DMS 510 that manages or facilitates tasks performed by the DMS 510. In this example, the central manager 525 may manage access authorization and filtering for authorization information in a multi-tenancy system (e.g., an audit authorization component).

The DMS 510 may include multiple computing objects 540 (e.g., N computing objects 540), which may be resources or other entities within the DMS 510. In some examples, the DMS 510 may include one or more clusters (e.g., storage clusters or storage nodes), and the computing objects 540 may represent examples of a cluster or a portion of a cluster of the DMS 510. The computing objects may be, for example, virtual machines, folders, filesets, databases, other computing objects, or any combination thereof. Each computing object 540 of the DMS 510 may be associated with or identified by a respective object ID (e.g., a unique ID). The computing objects 540 may be stored at the DMS 510, at the central manager 525, at one or more other servers or databases associated with or coupled to the DMS 510, or any combination thereof. The computing objects 540 may be organized into a computing object hierarchy, as described in further detail elsewhere herein, including with reference to FIG. 3.

The DMS 510 may obtain audit information for users of the DMS 510. Each user may log in to the DMS 510 (e.g., via a user interface using a computing device 515). Each log-in session may be associated with a respective tenant. For example, a user (e.g., an administrator or some other user of a tenant) may log in to the DMS 510 as part of or using the respective tenant. In some examples, a single user may be able to establish multiple log-in sessions with the DMS 510, each log-in session associated with a different tenant. The DMS 510 may monitor events associated with and operations performed by each user that is logged in to the DMS 510. The DMS 510 may maintain a log or record of the events and operations performed by each user when logged in to the DMS 510. The log may be stored in the form of audit information.

The DMS 510 may generate and store audit information for a given user in response to detecting an audit event. An audit event may include an event or operation performed by the user as part of a log-in session with the DMS 510. An audit event may include, for example, a user logging in to the DMS 510 and initiating a log-in session, a user deleting a file or some other resources when logged in to the DMS 510, a user modifying one or more configurations or settings (e.g., service level agreement configurations), other critical actions performed by the user when logged in to the DMS 510, or any combination thereof. The DMS 510 may determine which events and operations include auditable events. In some examples, the events that count as auditable events may be different for different tenants. The DMS 510 may monitor operations performed by each user to determine whether an audit event has been performed.

In response to detecting an audit event performed by a user of the DMS 510, the DMS 510 may generate audit information to store a record of that audit event occurring. The audit information may include, for example, data or metadata that indicates a time of the audit event, a type of the audit event, a duration of the audit event, a user ID of the user that performed the audit event, an ID of an entity that was the object or target of the audit event, or any combination thereof. The DMS 510 may store the audit information in an audit information database 530. In some examples, the audit information may indicate a subject and an object of the audit event. The subject may represent a user or other entity that performs the audit event, and the object may represent a user, computing object, or other entity that is the target of the event (e.g., on which the audit operation is performed). For example, if a first user updates one or more parameters or settings associated with a computing object 540, the DMS 510 may generate and store audit information that records information about the audit event and that the first user is the subject and the computing object 540) is the object of the audit event.

As described herein, when the DMS 510 generates audit information for a given user, the DMS 510 may analyze context information for a log-in session of the user. The context information may indicate a user ID of the user, a tenant ID of a tenant to which the user is logged in, other information, or any combination thereof. The DMS 510 may store the tenant ID associated with the user with the audit information in the audit information database 530. For example, each section or portion of audit information (e.g., audit information generated during each audit) may be indexed by a respective tenant ID associated with a tenant to which the user being audited was logged in. By storing the tenant ID with the audit information in the audit information database 530, the DMS 510 may efficiently and reliably determine which tenant is associated with the audit information, which may improve security and reduce latency associated with backup and management of data by the DMS 510.

In some examples, the DMS 510 may store the audit information in a table format in the audit information database 530. For example, the DMS 510 may store the audit information in one or more rows, where each row may include audit information for a respective audit and a corresponding tenant ID. In some examples, multiple rows of audit information may include a same tenant ID if, for example, the DMS 510 audits multiple users of a same tenant, or audits a single user multiple times (e.g., if a user performs multiple audit events). In the example illustrated in FIG. 5, a first row of the audit information database 530) may include audit information for an audit of a user logged in to or associated with a first tenant having a tenant ID #1. A second row and a third row of the audit information database 530 may include audit information for an audit of one or two users logged in to or associated with a second tenant having a tenant ID #2. Other rows of audit information may include audit information for audits of users logged in to the first tenant, the second tenant, or any other tenant of the DMS 510. In some examples, the DMS 510 may additionally or alternatively store the ID of the user, the ID of the entity that is the object of the audit event, or both with the audit information.

In some examples, a first user of the DMS 510 may request to view audit information for another entity of the DMS 510, such as a second user or a computing object. The first user may be logged in to the DMS 510 via a tenant of the multiple tenants supported by the DMS 510. For example, the first user may be an administrator or other user of a tenant. As part of the log-in session with the DMS 510, the first user may output (e.g., send, transmit) an audit information request 545 to the DMS 510. The first user may utilize a computing device 515 to log in to the DMS 510 and access a user interface that displays account settings and information associated with the first user's log-in session. The first user may send the audit information request 545 via the user interface and the network 520 to the DMS 510. The audit information request 545 may indicate a request for the first user to view or access audit information and may indicate an entity associated with the requested audit information. For example, the first user may request to view auditable events that were performed by a second user when logged in to the DMS 510, or auditable events that were performed on the second user, or auditable events that were performed on a set of one or more computing objects 540, or any combination thereof.

Techniques, systems, and devices described herein provide for the DMS 510 to determine whether the first user that sent the audit information request 545 has permission to access the requested audit information for the entity based on a first tenant associated with the log-in session by the first user, while accounting for impacts of a multi-level hierarchical multi-tenancy environment. In response to receiving the audit information request 545, the DMS 510 may determine an ID of the first user and an ID of the first tenant to which the first user is logged in based on context information for the log-in session via which the audit information request 545 is sent. The context information may include information that defines or identifies the log-in session of the first user, including the user ID, the tenant ID, other context information, or any combination thereof.

After determining the tenant ID associated with the audit information request 545, the DMS 510 (e.g., the central manager 525) may identify authorization information associated with the tenant. The authorization information may indicate that the tenant has access to an authentication domain or other node or entity within an authentication hierarchy associated with multiple tenants supported by the DMS 510. For example, the DMS 510 may scan an authentication hierarchy associated with the tenants supported by the DMS 510 and determine a node in the authentication hierarchy to which the tenant has access. The node may be, for example, an authentication domain, a user, or a user group of one or more users. The tenant may have authorization over or permission to access all nodes (e.g., users, user groups, subtenants) below the node or authentication domain in the authentication hierarchy. The authentication hierarchy may represent an example of the authentication hierarchy 400 described with reference to FIG. 4. Additionally, or alternatively, the authorization information may indicate a set of one or more computing objects 540 to which the tenant has access within a computing object hierarchy, such as the computing object hierarchy 300 described with reference to FIG. 3.

If the first user requests to view audit information associated with a second user, the DMS 510 may determine a hierarchical relationship between the second user indicated via the audit information request 545 and the authentication domain to which the tenant associated with the audit information request 545 has access in the authentication domain. That is, the DMS 510 may determine whether the second user is included in or below the authentication domain in the authentication hierarchy. The DMS 510 may determine whether the first user is authorized or permitted to access the requested audit information for the second user based on the hierarchical relationship.

If the second user is below the authentication domain in the authentication hierarchy, the DMS 510) may determine that the tenant associated with the audit information request 545 is authorized to access the second user, and the DMS 510 may output (e.g., send, transmit, export, mount) the requested audit information for the second user to the first user via the network 520 and the computing device 515. The first user may determine whether to adjust one or more privacy settings or configurations of the second user based on the audit information. For example, if the first user is an administrator of the tenant, and the second user is a user of the same tenant or a subtenant of the tenant, the audit information may indicate whether the second user is in compliance with security guidelines and settings for the tenant. If the audit information indicates that the second user performed an unauthorized operation, the first user may remove the second user from the tenancy chain. That is, the first user may request that the DMS 510 revoke access by the second user to the subtenant, the tenant, or both, and any computing resources and other data associated with the subtenant and the tenant.

If the second user is not below or included in the authentication domain in the authentication hierarchy, the DMS 510 may determine that the tenant associated with the audit information request 545 is not authorized to access the second user, and the DMS 510 may refrain from outputting the requested audit information for the second user to the first user.

In some examples, if the audit information request 545 requests audit information associated with one or more computing objects 540, the DMS 510 may determine a hierarchical relationship between the one or more computing objects 540 indicated via the audit information request 545 and a set of one or more computing objects 540 to which the tenant has access in a computing object hierarchy. If the requested computing objects 540 are included in or below the set of one or more computing objects 540 to which the tenant has access in a computing object hierarchy, the DMS 510 may output (e.g., send, transmit, export, mount) the requested audit information for the one or more computing objects 540 indicated via the audit information request 545 to the first user via the network 520 and the computing device 515. The first user may adjust one or more settings or configurations associated with the computing objects 540 based on an analysis of the audit information.

If the requested computing objects 540 are not included in or below the set of one or more computing objects 540 to which the tenant has access in a computing object hierarchy, the DMS 510 may determine that the first user is not authorized to access the requested audit information, and the DMS 510 may refrain from outputting the requested audit information for the one or more computing objects 540 indicated via the audit information request 545 to the first user.

The DMS 510 may similarly verify authorization for any audit information request 545 received from any other user of the DMS 510. The DMS 510 may thereby ensure audit information for users of a multi-tenancy system is secure and reliable by verifying authorization of a user to access the audit information before outputting the audit information to the user, which may improve reliability of the DMS 510

In some examples, a user of the DMS 510 may request to filter audit information by one or more parameters, such a type of audit information, per tenant, per subject, per object, or some other filtering criteria. As described herein, the DMS 510 may use the tenant IDs stored in the audit information database 530 to support filtering the audit information in the audit information database 530 per tenant. In some examples, a user of a relatively high level tenant (e.g., an administrator of a global organization, MSP, or other tenant that has authorization over at least one subtenant) may request to view audit information associated with users of one or more subtenants. After establishing or initiating a log-in session with the DMS 510 via the tenant, the user may access a user interface via the computing device 515. The user may perform a search or other request in an audit page of the user interface to view audit information for one or more subtenants. The DMS 510 may receive the filtering request 550 via the network 520. The filtering request 550 may indicate an ID of the subtenant(s) for which the user requests to view audit information.

In response to receiving the filtering request 550 to view audit information for a given subtenant, the DMS 510 (e.g., the central manager 525 or some other component of the DMS 510) may filter the audit information in the audit information database 530 per tenant. For example, the DMS 510 may filter or select audit information that is associated with users of the subtenant indicated via the filtering request 550 from among all of the audit information stored in the audit information database 530. To perform the filtering, the DMS 510 may scan the audit information database 530 and identify each row that includes a tenant ID of the subtenant indicated via the filtering request 550. The DMS 510 may select the audit information that includes the tenant ID of the subtenant and may output that audit information to the first user via the user interface (e.g., via the network 520 and the computing device 515).

In the example illustrated in FIG. 5, if the filtering request 550 requests to view audit information for a tenant having the tenant ID #1, the DMS 510 may select the first and final rows of audit information in the audit information database 530 (e.g., and any other rows not pictured in FIG. 5 that include the tenant ID #1). The DMS 510 may output the selected audit information to the first user in response to the filtering request 550. In some examples, the DMS 510 may display the audit information in a list or other organized format. The DMS 510 may be operable to paginate, sort, or otherwise further filter the audit information in the user interface based on one or more other criteria. By storing tenant IDs with audit information, the DMS 510 may thereby provide filtered audit information to a user of the DMS 510.

In some examples, the DMS 510 may verify authorization of the user to access the audit information before outputting the filtered audit information. For example, the DMS 510 may use the tenant ID of the tenant associated with the first user to determine whether the second user is below an authentication domain that the tenant is authorized to access in the authentication hierarchy. If the second user is not below the authentication domain, the DMS 510 may refrain from outputting the filtered audit information to the first user. second user is not below the authentication domain, the DMS 510 may output the filtered audit information to the first user.

The DMS 510 described herein may thereby obtain and store audit information for multiple users of the DMS 510 while managing client data for multiple tenants. By using the described techniques for authorizing access to audit information and filtering audit information, the DMS 510 may support efficient, secure, and reliable management of audit information in a multi-tenant system.

Figure 6:
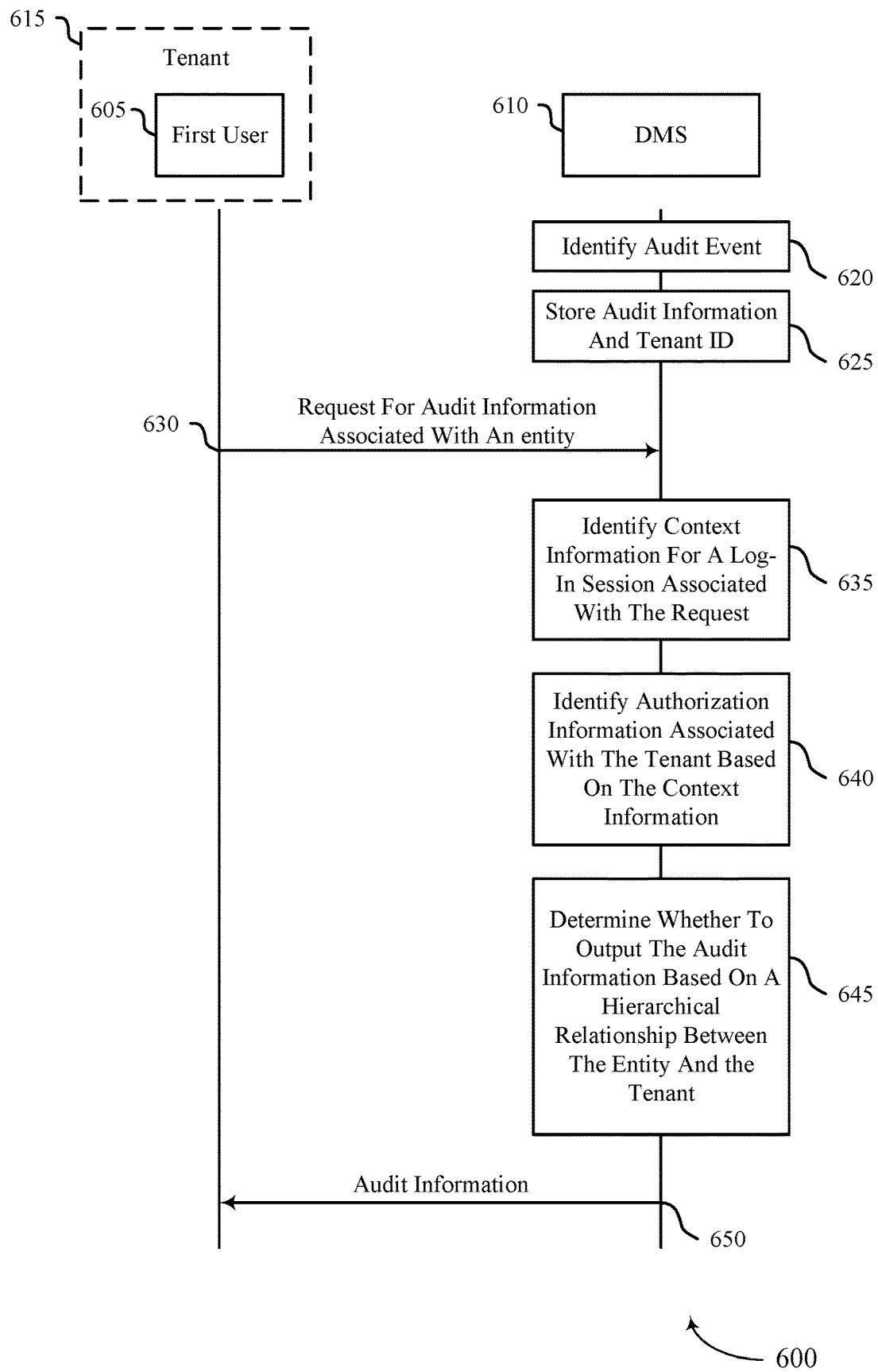
FIG. 6 illustrates an example of a process flow that supports access authorization for audit information in a multi-tenancy DMS in accordance with aspects of the present disclosure.

FIG. 6 illustrates an example of a process flow 600 that supports access authorization for audit information in a multi-tenancy DMS in accordance with aspects of the present disclosure. The process flow 600 may implement or be implemented by aspects of the computing environments 100 and 500, the multi-tenancy system 200, the computing object hierarchy 300, and the authentication hierarchy 400, as described with reference to FIGS. 1-5. For example, the process flow 600 may be implemented by a first user 605, which may be logged in to a tenant 615 (e.g., an administrator for the tenant 615, or some other user 605 of the tenant 615) and one or more components of a DMS 610, which may represent examples of corresponding devices and components as described with reference to FIGS. 1-5. In some examples, the first user 605 may represent an example of a computing device that may communicate with the DMS 610 via a user interface, such as the computing devices 115 or 515 described with reference to FIGS. 1 and 5. In this example, the DMS 610 may determine whether the first user 605 has permission to access audit information for a second user of the multi-tenancy DMS 610 while accounting for impacts of a multi-level hierarchical multi-tenancy environment.

In some aspects, the operations illustrated in the process flow 600 may be performed by hardware (e.g., including circuitry, processing blocks, logic components, and other components), code (e.g., software or firmware) executed by a processor, or any combination thereof. For example, aspects of the process flow 600 may be implemented or managed by a DMS, an audit authorization component, or some other software or application within a DMS 610 that is configured to manage backup and restoration of data and other computing resources for multiple tenants.

Although the first user 605 and the DMS 610 are illustrated in FIG. 6, it is to be understood that the process to authorize access for audit information in a multi-tenancy system as described herein may be performed by any one or more components of a DMS 610, including components not shown in FIG. 6. For example, the DMS 610 may include or be coupled with a central manager, one or more other components, or any combination thereof (not pictured in FIG. 6) that may be configured to facilitate or manage any one or more of the processes illustrated in FIG. 6. Additionally, or alternatively, one or more components may perform tasks or may be configured to function in a different manner than illustrated in FIG. 6. Alternative examples of the following may be implemented, where some steps are performed in a different order than described or are not performed at all. In some cases, steps may include additional features not mentioned below, further steps may be added, or different components may perform the steps.

At 620, in some examples, the DMS 610 may identify an audit event for an entity of the DMS 610. The DMS may monitor operations performed by the users of the DMS 610 when the users are logged in to the DMS 610. Identifying the audit event may include identifying a log-in operation, an operation to change one or more service level agreement settings, audit tasks performed by a user, a delete operation, an operation to change a configuration of a user, one or more other auditable operations, or any combination thereof. The entity may be a subject of the audit event, such as the first user 605 or some other user of the DMS 610 that performs the audit event. Additionally, or alternatively, the entity may be an object (e.g., target) of the audit event, such as a user or an object that is being modified or changed by the audit event. In some examples, the DMS 610 may dynamically configure what types of operations count as auditable events. After identifying the audit event, the DMS 610 may identify context information for a log-in session associated with the user being audited (e.g., the subject of the audit event). The context information may include a user ID of the user and a tenant ID of a tenant to which the user is logged in.

At 625, in some examples, after identifying the audit event and the corresponding context information, the DMS 610 may store audit information that indicates the audit event. The DMS 610 may store the tenant ID with the audit information, in some examples. The DMS 610 may thereby store a tenant ID mapped to each portion of audit information in an audit information database of the DMS 610, such as the audit information database 530) described with reference to FIG. 5.

At 630, the first user 605 may output (e.g., transmit, send) a request, to the DMS 610 via a user interface, to provide the first user 605 with audit information associated with an entity of the DMS 610. In some examples, the first user 605 may be an administrator or other user of the tenant 615, and the tenant 615 may be a higher-level tenant in a hierarchy of multiple tenants of the DMS 610. The DMS 610 may include multiple computing objects and may provide protection for data sources associated with the multiple tenants. The entity may be a subject, such as a second user or an object, such as a second user or a computing object that is a target of the audit information.

At 635, the DMS 610 may identify, in response to the request, context information for a log-in session associated with the request. For example, the first user 605 may log in to the DMS 610 to initiate the log-in session. The first user 605 may transmit the request as part of the log-in session. The first user 605 may log in to the DMS 610 as a user of the tenant 615 (e.g., an administrator or other user of the tenant 615). The context information for the log-in session may include a tenant ID of the tenant 615 associated with the request. The Tenant ID may identify or distinguish the tenant 615 from among the other tenants of the multi-tenancy DMS 610.

At 640, the DMS 610 may identify, based on the context information, authorization information associated with the tenant. In some examples, if the DMS 610 is performing access control based on a second user associated with the audit information (e.g., a subject or an object of the audit event), the DMS 610 may scan an authentication hierarchy associated with the multiple tenants of the DMS 610 using the tenant ID of the tenant 615 associated with the request to identify authorization information. The authentication hierarchy may represent a hierarchy of authentication domains between tenants, user groups, and users, as described in further detail elsewhere herein, including with reference to FIG. 4. In some examples, scanning the authentication hierarchy may include scanning a database or table of information that represents the hierarchy (e.g., a "flattened" hierarchy). The authorization information associated with the tenant 615 may indicate that the tenant 615 has access to one or more nodes within the authentication hierarchy. The one or more nodes may be an authentication domain, a user of the DMS 610, or a user group of the DMS 610, as described with reference to FIG. 4.

In some other examples, if the DMS 610 is performing access control based on a computing object associated with the audit information (e.g., an object of the audit event), the DMS 610 may scan a computing object hierarchy associated with the DMS 610, such as the computing object hierarchy 300 described with reference to FIG. 3, to identify the authorization information. The authorization information may include a set of one or more computing objects to which the tenant 615 associated with the request has access in the computing object hierarchy.

At 645, the DMS 610 may determine whether to output, to the first user 605 in response to the request, the audit information associated with the entity based on a hierarchical relationship, within a hierarchy of the DMS 610 (e.g., the authentication hierarchy or the computing object hierarchy) between the entity and the tenant 615 associated with the request. For example, if the first user 605 requests audit information associated with a second user, and the DMS 610 performs access control based on the subject or object of audit information, the DMS 610 may determine whether the tenant 615 has access to the second user or an authentication domain that includes the second user in the authentication hierarchy. If the first user 605 requests audit information associated with at least one computing object, and the DMS 610 performs access control based on the object of audit information, the DMS 610 may determine whether the at least one computing object is included in a set of one or more computing objects to which the tenant 615 has access in a computing object hierarchy. In some examples, the DMS 610 may perform access control based on one or both of the subject and the object of the audit information.

At 650, in some examples, the DMS 610 may output (e.g., send, transmit), to the first user 605 via the user interface and in response to the request, the audit information associated with the entity. The DMS 610 may output the audit information to the first user 605 if the hierarchical relationship indicates that the second user is below the authentication domain within the authentication hierarchy or that the at least one computing object is included in the set of one or more computing objects to which the tenant 615 has access in the computing object hierarchy. That is, the DMS 610 may output the audit information to the first user 605 (e.g., display the audit information via a user interface) if the tenant 615 to which the first user 605 is logged in has authorization to access the entity, such as the second user or the at least one computing object, or both.

In some examples, the DMS 610 may refrain from outputting, to the first user 605 in response to the request, the audit information associated with the entity. The DMS 610 may refrain from outputting the audit information if the hierarchical relationship indicates that the entity (e.g., a second user) is not below the authentication domain within the authentication hierarchy, or if the entity (e.g., at least one computing object) is not assigned to the tenant in a computing object hierarchy, or both. That is, the DMS 610 may refrain from outputting the audit information to the first user 605 if the tenant 615 to which the first user 605 is logged in does not have authorization to access the second user, or the at least one computing object, or both.

The DMS 610 may thereby facilitate secure and reliable exchanges of audit information with customers or users 605 of the DMS 610. The DMS 610 may use context information associated with a log-in session of a user 605 to determine a tenant 615 to which the user 605 is logged in. The DMS 610 may use a tenant ID of the tenant 615 to determine whether the tenant 615 is authorized or permitted to access the entity associated with requested audit information. The DMS 610 may thereby support multiple tenants while maintaining reliable and secure data management services for each tenant and its corresponding users separately.

Figure 7:
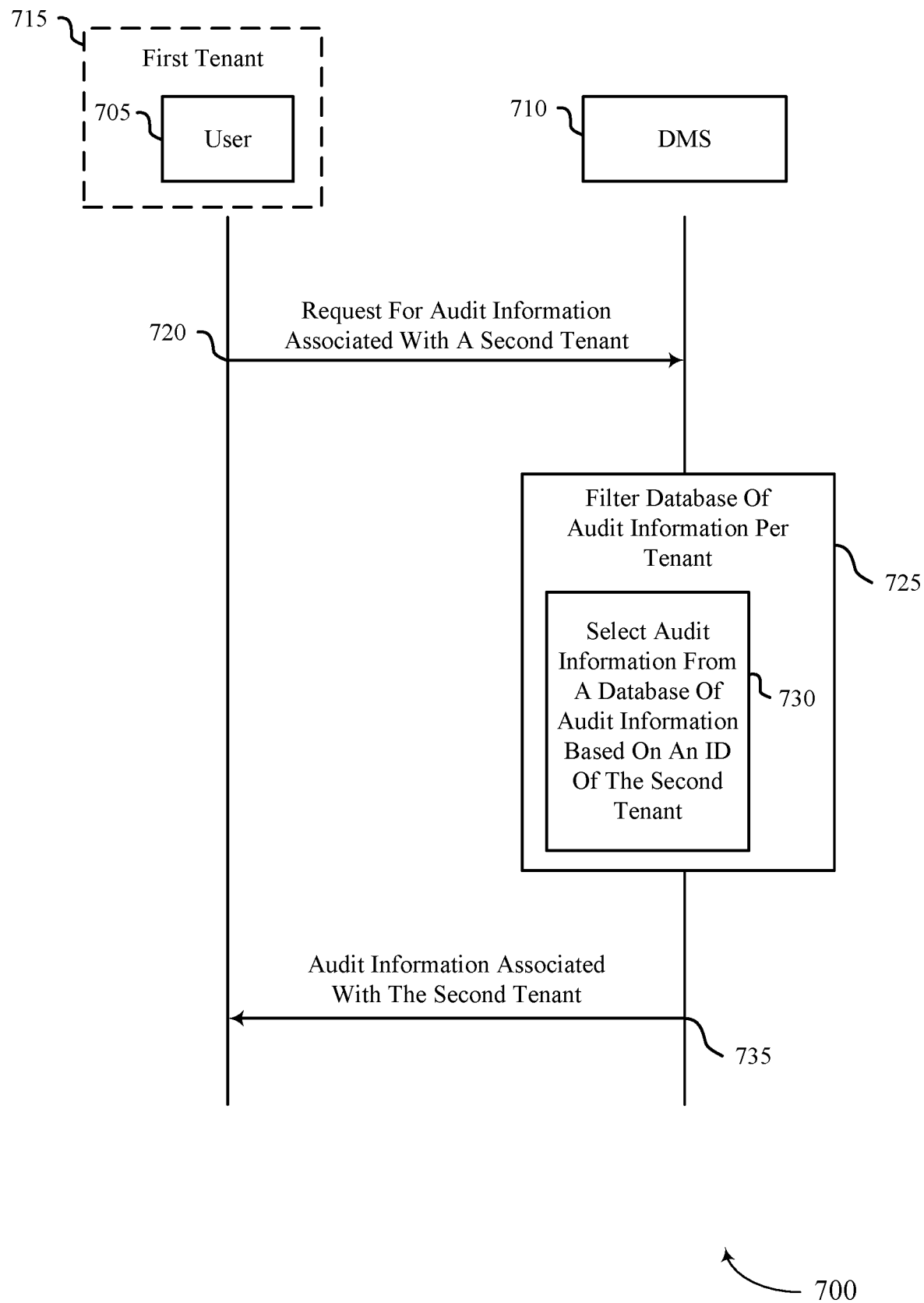
FIG. 7 illustrates an example of a process flow that supports access authorization for audit information in a multi-tenancy DMS in accordance with aspects of the present disclosure.

FIG. 7 illustrates an example of a process flow 700 that supports access authorization for audit information in a multi-tenancy DMS in accordance with aspects of the present disclosure. The process flow 700 may implement or be implemented by aspects of the computing environments 100 and 500, the multi-tenancy system 200, the computing object hierarchy 300, the authentication hierarchy 400, and the process flow 700, as described with reference to FIGS. 1-6. For example, the process flow 700 may be implemented by a user 705, which may be logged in to a first tenant 715 (e.g., an administrator for the first tenant 715, or some other user 705 of the first tenant 715) and one or more components of a DMS 710, which may represent examples of corresponding devices and components as described with reference to FIGS. 1-5. In some examples, the user 705 may represent an example of a computing device that may communicate with the DMS 710 via a user interface, such as the computing devices 115 or 515 described with reference to FIGS. 1 and 5. In this example, the DMS 710 may generate and store audit information associated with multiple users of the multi-tenancy DMS 710, and the user 705 may request the DMS 710 to filter audit information per tenant.

In some aspects, the operations illustrated in the process flow 700 may be performed by hardware (e.g., including circuitry, processing blocks, logic components, and other components), code (e.g., software or firmware) executed by a processor, or any combination thereof. For example, aspects of the process flow 700 may be implemented or managed by a DMS 710, an audit authorization component, or some other software or application within a DMS 710 that is configured to manage backup and restoration of data and other computing resources for multiple tenants.

Although the user 705 and the DMS 710 are illustrated in FIG. 7, it is to be understood that the process to authorize access for audit information in a multi-tenancy system as described herein may be performed by any one or more components of a DMS 710, including components not shown in FIG. 7. For example, the DMS 710 may include or be coupled with a central manager, one or more other components, or any combination thereof (not pictured in FIG. 7) that may be configured to facilitate or manage any one or more of the processes illustrated in FIG. 7. Additionally, or alternatively, one or more components may perform tasks or may be configured to function in a different manner than illustrated in FIG. 7. Alternative examples of the following may be implemented, where some steps are performed in a different order than described or are not performed at all. In some cases, steps may include additional features not mentioned below, further steps may be added, or different components may perform the steps.

At 720, the user 705 may output (e.g., transmit, send) a request to view audit information associated with one or more users of a second tenant of the DMS 710 (not pictured in FIG. 7). For example, the user 705 may be an administrator or some other user 705 of the first tenant 715, and the first tenant 715 may be a higher level tenant within a hierarchy of the multiple tenants supported by the DMS 710 (e.g., a global organization, an MSP, or some other higher level tenant) than the second tenant. The second tenant may be a subtenant of the first tenant 715. In some examples, the user 705 may request to view all audit information previously obtained by and stored by the DMS 710 that is associated with any user of the second tenant, or the user 705 may request to view all audit information previously obtained by and stored by the DMS 710 that is associated with all users of any subtenant of the first tenant 715 that are assigned to or below the first tenant 715 in the tenant hierarchy (e.g., the second tenant and any other subtenants of the first tenant 715).

In some examples, the user 705 may access a user interface of the DMS 710 and perform a search within the user interface. If the user 705 searches for a given organization or subtenant, the search may correspond to or trigger the request for audit information associated with the given organization or subtenant. For example, the user 705 may request to view a display on the user interface of the audit information for the given subtenant.

At 725, the DMS 710 may filter a database of audit information stored by the DMS 710. The DMS 710 may filter the audit information per tenant or group of tenants and in response to the request from the user 705, one or more other requests from other users of the DMS 710, or any combination thereof.

As part of filtering the database of audit information for the second tenant in response to the request, at 730, the DMS 710 may scan the database of audit information and select audit information from within the database that includes a tenant ID of the second tenant. That is, the DMS 710 may select audit information associated with users that were logged in to the second tenant at the time the audit was performed. The DMS 710 may refrain from selecting, or may filter out, other audit information in the audit information database that is associated with other tenants different than the second tenant indicated via the request. By storing audit information with corresponding tenant IDs, the DMS 710 may thereby filter the audit information database per tenant, which may improve reliability and efficiency of the services provided by the DMS 710.

At 735, the DMS 710 may output (e.g., transmit, send) the audit information associated with the second tenant based on filtering the database of audit information. The DMS 710 may output the audit information that was selected by the DMS 710 and includes the tenant ID of the second tenant. In some examples, the DMS 710 may display the audit information for the second tenant as a list or set via a user interface. For example, the DMS 710 (e.g., a backend of the audit query) may support sorting, pagination, and filtering of the audit information. In some examples, before outputting the audit information, the DMS 710 may determine whether the user 705 is authorized to access the requested audit information based on a hierarchical relationship between the first tenant 715 to which the user 705 is logged in and the second user, as described in further detail elsewhere herein, including with reference to FIG. 6.

In some examples, although not illustrated in FIG. 7, the user 705 may request to view audit information associated with two or more other tenants or subtenants. The DMS 710 may similarly filter the audit information database per group of tenants and output the audit information for the multiple tenants to the user 705. The DMS 710 may additionally, or alternatively, support filtering and pagination of the audit information database per subject of the audit information, per object of the audit information, per user, or per any other audit information parameter or entity.

By storing tenant IDs with corresponding audit information, the DMS 710 may thereby support filtering audit information per tenant as described herein. The described techniques may improve security, reliability, and customer satisfaction while accounting for impacts of a multi-level hierarchical multi-tenancy environment.

Figure 8:
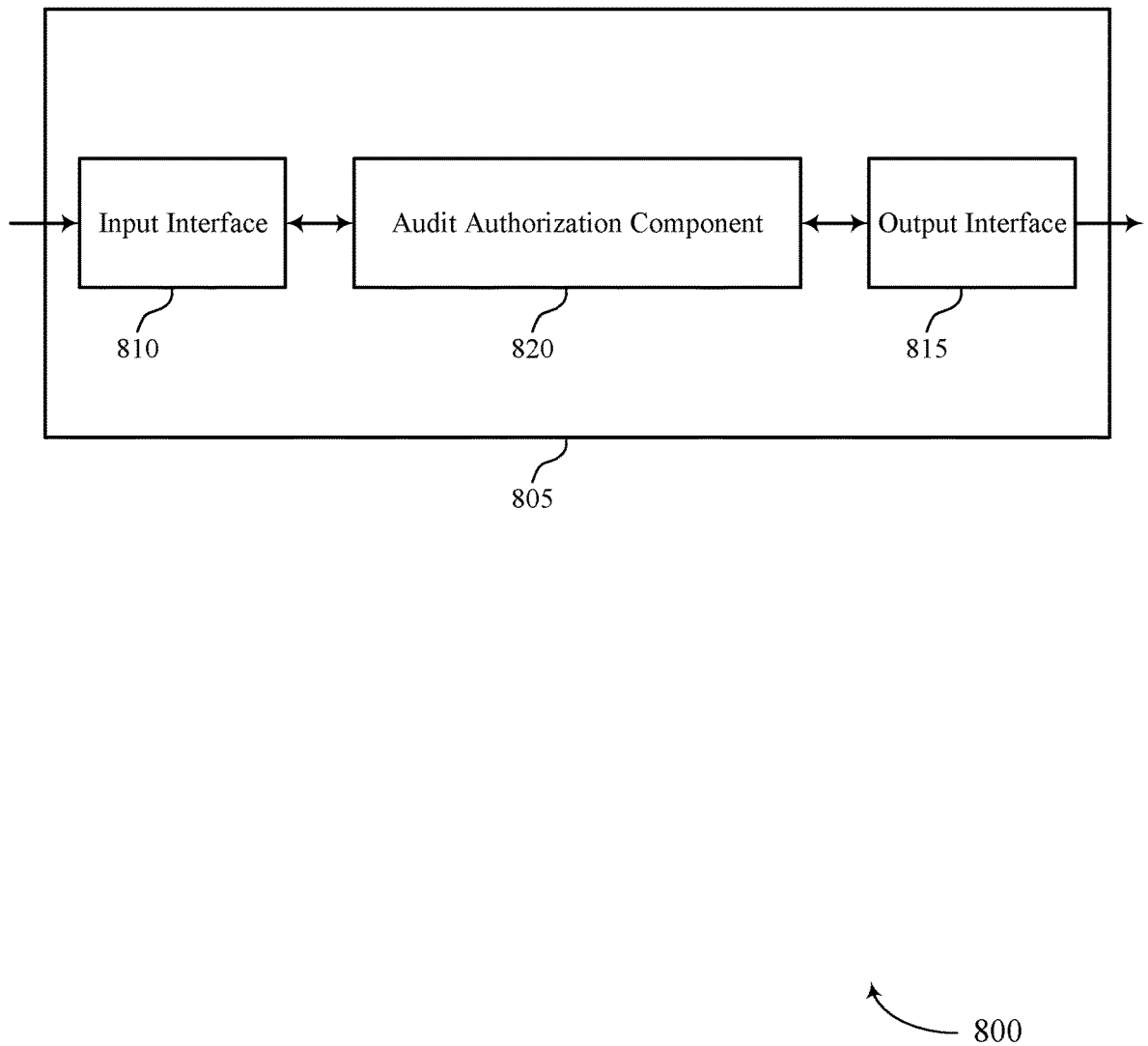
FIGS. 8 and 9 illustrate block diagrams of devices that support access authorization for audit information in a multi-tenancy DMS in accordance with aspects of the present disclosure.

FIG. 8 illustrates a block diagram 800 of a system 805 that supports access authorization for audit information in a multi-tenancy DMS in accordance with aspects of the present disclosure. The system 805 may be an example of aspects of a DMS as described herein. The system 805 may include an input interface 810, an output interface 815, and an audit authorization component 820. The system 805 may also include a processor. Each of these components may be in communication with one another (e.g., via one or more buses).

The input interface 810 may manage input signaling for the system 805. For example, the input interface 810 may receive input signaling (e.g., messages, packets, data, instructions, commands, or any other form of encoded information) from other systems or devices. The input interface 810 may send signaling corresponding to (e.g., representative of or otherwise based on) such input signaling to other components of the system 805 for processing. For example, the input interface 810 may transmit such corresponding signaling to the audit authorization component 820 to support access authorization for audit information in a multi-tenancy DMS. In some cases, the input interface 810 may be a component of a network interface 1125 as described with reference to FIG. 11.

The output interface 815 may manage output signaling for the system 805. For example, the output interface 815 may receive signaling from other components of the system 805, such as the audit authorization component 820, and may transmit such output signaling corresponding to (e.g., representative of or otherwise based on) such signaling to other systems or devices. In some cases, the output interface 815 may be a component of a network interface 1125 as described with reference to FIG. 11.

The audit authorization component 820, the input interface 810, the output interface 815, or various combinations thereof or various components thereof may be examples of means for performing various aspects of access authorization for audit information in a multi-tenancy DMS as described herein. For example, the audit authorization component 820, the input interface 810, the output interface 815, or various combinations or components thereof may support a method for performing one or more of the functions described herein.

In some examples, the audit authorization component 820, the input interface 810, the output interface 815, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the audit authorization component 820, the input interface 810, the output interface 815, or various combinations or components thereof may be implemented in code (e.g., as communications management software or firmware) executed by a processor. If implemented in code executed by a processor, the functions of the audit authorization component 820, the input interface 810, the output interface 815, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the audit authorization component 820 may be configured to perform various operations (e.g., receiving, monitoring, transmitting) using or otherwise in cooperation with the input interface 810, the output interface 815, or both. For example, the audit authorization component 820 may receive information from the input interface 810, send information to the output interface 815, or be integrated in combination with the input interface 810, the output interface 815, or both to receive information, transmit information, or perform various other operations as described herein.

For example, the audit authorization component 820 may be configured as or otherwise support a means for receiving, by a DMS, a request to provide a first user of the DMS with audit information associated with an entity of the DMS, where the DMS includes a set of multiple computing objects, and where the DMS is operable to provide protection for data sources associated with a set of multiple tenants of the DMS. The audit authorization component 820 may be configured as or otherwise support a means for identifying, in response to the request, context information for a log-in session associated with the request, where the context information for the log-in session includes an ID of a tenant associated with the request, the tenant included in the set of multiple tenants. The audit authorization component 820 may be configured as or otherwise support a means for identifying, based on the ID of the tenant associated with the request, authorization information associated with the tenant, where the authorization information indicates that the tenant has access to a set of entities within a hierarchy associated with the set of multiple tenants. The audit authorization component 820 may be configured as or otherwise support a means for determining whether to output, to the first user in response to the request, the audit information associated with the entity based on a hierarchical relationship, within the hierarchy, between the tenant and the entity.

By including or configuring the audit authorization component 820 in accordance with examples as described herein, the system 805 (e.g., a processor controlling or otherwise coupled with the input interface 810, the output interface 815, the audit authorization component 820, or a combination thereof) may support techniques for improved data management reliability, improved DMS performance and compliance for applications and systems that use objects managed by the system 805, reduced power consumption, reduced processing complexity.

Figure 9:
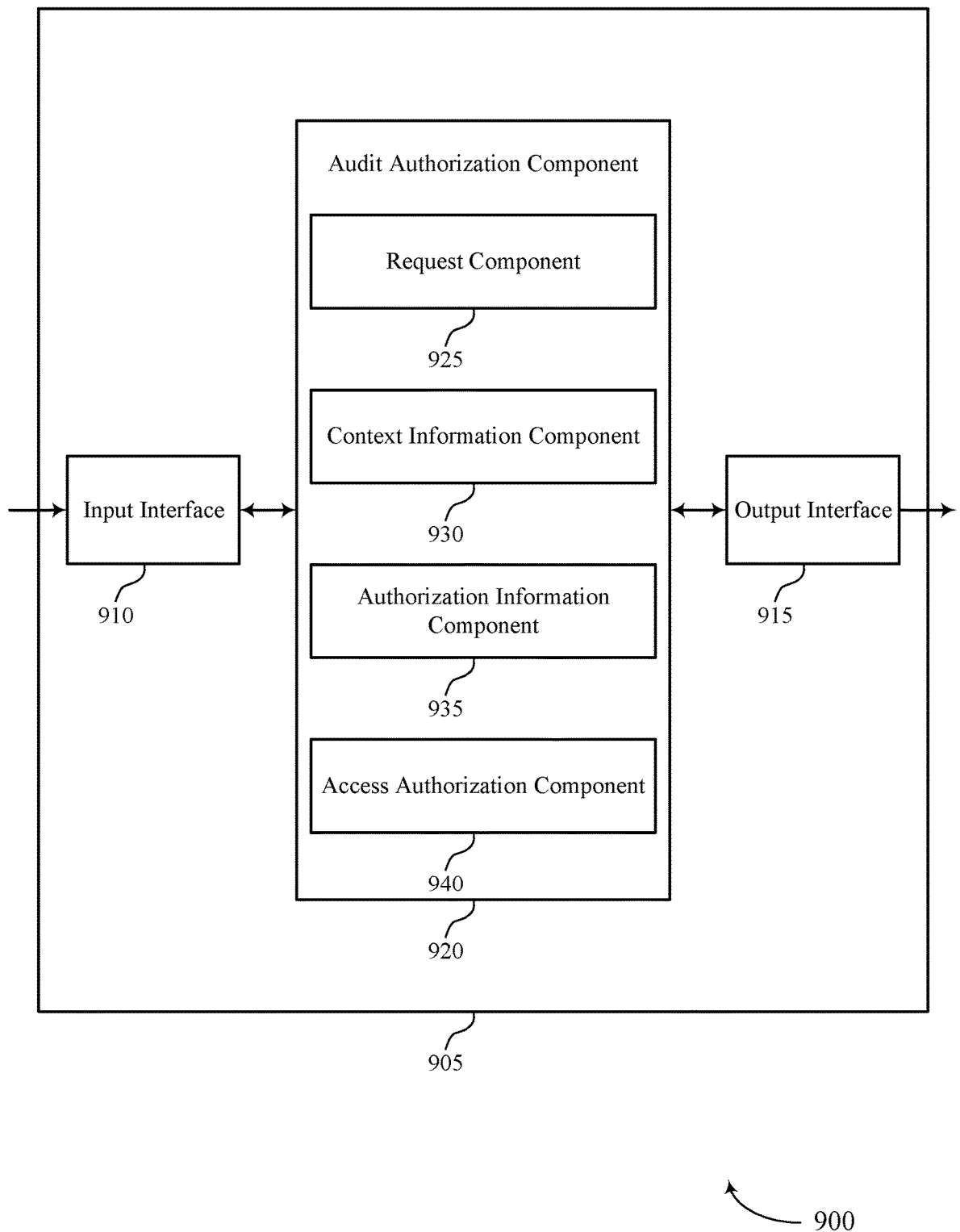

FIG. 9 illustrates a block diagram 900 of a system 905 that supports access authorization for audit information in a multi-tenancy DMS in accordance with aspects of the present disclosure. In some examples, the system 905 may be an example of aspects of one or more components described with reference to FIG. 1, such as a DMS 110. The system 905 may be an example of aspects of a system 805 or a DMS 110 as described herein. The system 905 may include an input interface 910, an output interface 915, and an audit authorization component 920. The system 905 may also include one or more processors. Each of these components may be in communication with one another (e.g., via one or more buses, communications links, communications interfaces, or any combination thereof).

The input interface 910 may manage input signaling for the system 905. For example, the input interface 910 may receive input signaling (e.g., messages, packets, data, instructions, commands, or any other form of encoded information) from other systems or devices. The input interface 910 may send signaling corresponding to (e.g., representative of or otherwise based on) such input signaling to other components of the system 905 for processing. For example, the input interface 910 may transmit such corresponding signaling to the audit authorization component 920 to support access authorization for audit information in a multi-tenancy DMS. In some cases, the input interface 910 may be a component of a network interface 1125 as described with reference to FIG. 11.

The output interface 915 may manage output signaling for the system 905. For example, the output interface 915 may receive signaling from other components of the system 905, such as the audit authorization component 920, and may transmit such output signaling corresponding to (e.g., representative of or otherwise based on) such signaling to other systems or devices. In some cases, the output interface 915 may be a component of a network interface 1125 as described with reference to FIG. 11.

The system 905, or various components thereof, may be an example of means for performing various aspects of access authorization for audit information in a multi-tenancy DMS as described herein. For example, the audit authorization component 920 may include a request component 925, a context information component 930, an authorization information component 935, an access authorization component 940, or any combination thereof. The audit authorization component 920 may be an example of aspects of an audit authorization component 820 as described herein. In some examples, the audit authorization component 920, or various components thereof, may be configured to perform various operations (e.g., receiving, monitoring, transmitting) using or otherwise in cooperation with the input interface 910, the output interface 915, or both. For example, the audit authorization component 920) may receive information from the input interface 910, send information to the output interface 915, or be integrated in combination with the input interface 910, the output interface 915, or both to receive information, transmit information, or perform various other operations as described herein.

The request component 925 may be configured as or otherwise support a means for receiving, by a DMS, a request to provide a first user of the DMS with audit information associated with an entity of the DMS, where the DMS includes a set of multiple computing objects, and where the DMS is operable to provide protection for data sources associated with a set of multiple tenants of the DMS. The context information component 930 may be configured as or otherwise support a means for identifying, in response to the request, context information for a log-in session associated with the request, where the context information for the log-in session includes an ID of a tenant associated with the request, the tenant included in the set of multiple tenants. The authorization information component 935 may be configured as or otherwise support a means for identifying, based on the ID of the tenant associated with the request, authorization information associated with the tenant, where the authorization information indicates that the tenant has access to a set of entities within a hierarchy associated with the set of multiple tenants. The access authorization component 940 may be configured as or otherwise support a means for determining whether to output, to the first user in response to the request, the audit information associated with the entity based on a hierarchical relationship, within the hierarchy, between the tenant and the entity.

Figure 10:
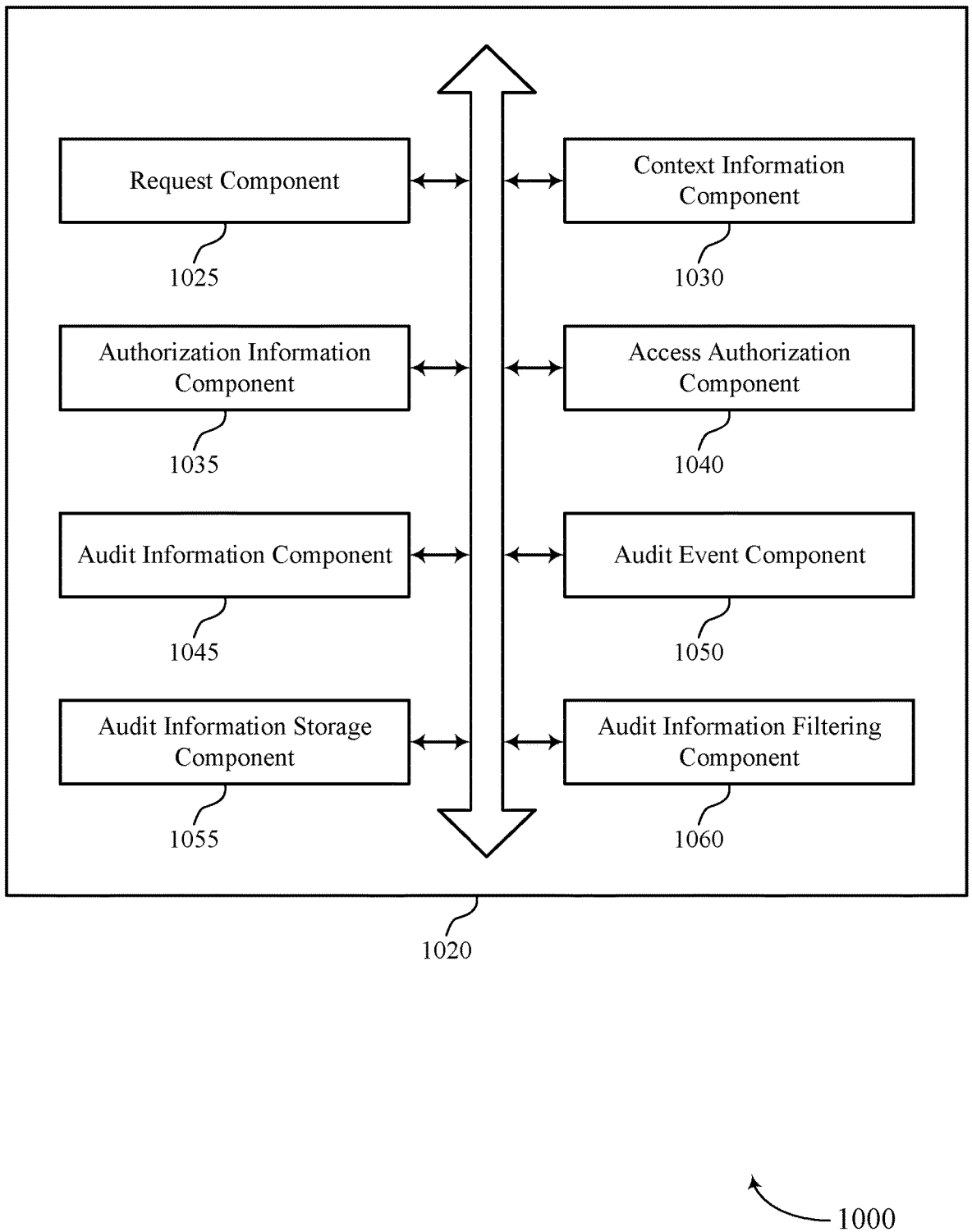
FIG. 10 illustrates a block diagram of an audit authorization component that supports access authorization for audit information in a multi-tenancy DMS in accordance with aspects of the present disclosure.

FIG. 10 illustrates a block diagram 1000 of an audit authorization component 1020 that supports access authorization for audit information in a multi-tenancy DMS in accordance with aspects of the present disclosure. The audit authorization component 1020 may be an example of aspects of an audit authorization component 820, an audit authorization component 920, or both, as described herein. The audit authorization component 1020, or various components thereof, may be an example of means for performing various aspects of access authorization for audit information in a multi-tenancy DMS as described herein. For example, the audit authorization component 1020 may include a request component 1025, a context information component 1030, an authorization information component 1035, an access authorization component 1040, an audit information component 1045, an audit event component 1050, an audit information storage component 1055, an audit information filtering component 1060, or any combination thereof. Each of these components may communicate, directly or indirectly, with one another (e.g., via one or more buses, communications links, communications interfaces, or any combination thereof).

The request component 1025 may be configured as or otherwise support a means for receiving, by a DMS, a request to provide a first user of the DMS with audit information associated with an entity of the DMS, where the DMS includes a set of multiple computing objects, and where the DMS is operable to provide protection for data sources associated with a set of multiple tenants of the DMS. The context information component 1030 may be configured as or otherwise support a means for identifying, in response to the request, context information for a log-in session associated with the request, where the context information for the log-in session includes an ID of a tenant associated with the request, the tenant included in the set of multiple tenants. The authorization information component 1035 may be configured as or otherwise support a means for identifying, based on the ID of the tenant associated with the request, authorization information associated with the tenant, where the authorization information indicates that the tenant has access to a set of entities within a hierarchy associated with the set of multiple tenants. The access authorization component 1040 may be configured as or otherwise support a means for determining whether to output, to the first user in response to the request, the audit information associated with the entity based on a hierarchical relationship, within the hierarchy, between the tenant and the entity.

In some examples, the audit information component 1045 may be configured as or otherwise support a means for obtaining the audit information associated with the entity, where entries within the audit information are associated with respective events including respective actions performed by the entity on respective objects, and where determining whether to output the audit information associated with the entity is further based on whether the tenant associated with the request has access to audit information associated with the respective objects.

In some examples, the audit information component 1045 may be configured as or otherwise support a means for obtaining the audit information associated with the entity, where entries within the audit information are associated with respective events including respective actions performed by respective subjects on the entity, and where determining whether to output the audit information associated with the entity is further based on whether the tenant associated with the request has access to audit information associated with the respective subjects.

In some examples, the authorization information indicates that the tenant has access to an authentication domain within the hierarchy, the hierarchy including an authentication hierarchy associated with the set of multiple tenants. In some examples, the hierarchical relationship indicates a relationship between the entity and the authentication domain in the authentication hierarchy.

In some examples, the audit information component 1045 may be configured as or otherwise support a means for outputting, to the first user in response to the request, the audit information associated with the entity based on the hierarchical relationship indicating that the entity is below the authentication domain within the authentication hierarchy.

In some examples, the audit information component 1045 may be configured as or otherwise support a means for refraining from outputting, to the first user in response to the request, the audit information associated with the entity based on the hierarchical relationship indicating that the entity is not below the authentication domain within the authentication hierarchy.

In some examples, the authentication domain includes a node within the authentication hierarchy, the node above a single user of a set of multiple users of the DMS in the authentication hierarchy. In some examples, the authentication domain includes a node within the authentication hierarchy, the node above a user group of the DMS in the authentication hierarchy.

In some examples, the authorization information indicates a set of one or more objects to which the tenant associated with the request has access within the hierarchy, the hierarchy including an object hierarchy associated with a set of multiple objects of the DMS. In some examples, the hierarchical relationship indicates a relationship between the entity and the set of one or more objects in the object hierarchy In some examples, the audit event component 1050 may be configured as or otherwise support a means for identifying an audit event for a third user of the DMS. In some examples, the context information component 1030 may be configured as or otherwise support a means for identifying, in response to identifying the audit event, second context information for a second log-in session associated with the third user, where the second context information for the second log-in session includes a second ID of a second tenant associated with the third user, the second tenant included in the set of multiple tenants. In some examples, the audit information storage component 1055 may be configured as or otherwise support a means for storing, in a database, second audit information associated with the audit event and the second ID of the second tenant associated with the third user.

In some examples, the audit event component 1050 may be configured as or otherwise support a means for monitoring one or more operations performed by the third user of the DMS based on the third user initiating the second log-in session, where identifying the audit event includes identifying an operation of the one or more operations.

In some examples, the request component 1025 may be configured as or otherwise support a means for receiving, from the first user as part of the log-in session associated with the tenant, a second request to view second audit information associated with one or more users of one or more other, where the one or more other tenants include one or more subtenants of the tenant within a tenant hierarchy associated with the set of multiple tenants. In some examples, the audit information filtering component 1060 may be configured as or otherwise support a means for filtering, per tenant or group of tenants and in response to the second request, a database of audit information stored by the DMS. In some examples, the audit information filtering component 1060 may be configured as or otherwise support a means for outputting, to the first user via a user interface in response to the second request, the second audit information associated with the one or more users of the one or more other tenants based on the filtering and the one or more other tenants including the one or more subtenants of the tenant within the tenant hierarchy.

In some examples, to support filtering the database of audit information per tenant or group of tenants, the audit information filtering component 1060 may be configured as or otherwise support a means for selecting the second audit information from among the database of audit information based on the second audit information including the ID of the tenant associated with the request, where remaining audit information in the database includes IDs of other tenants included in the set of multiple tenants.

In some examples, the first user initiates a second log-in session with the DMS after the log-in session, and second context information for the second log-in session associated with the first user includes a second ID of a second tenant included in the set of multiple tenants, the second tenant different than the tenant associated with the request.

Figure 11:
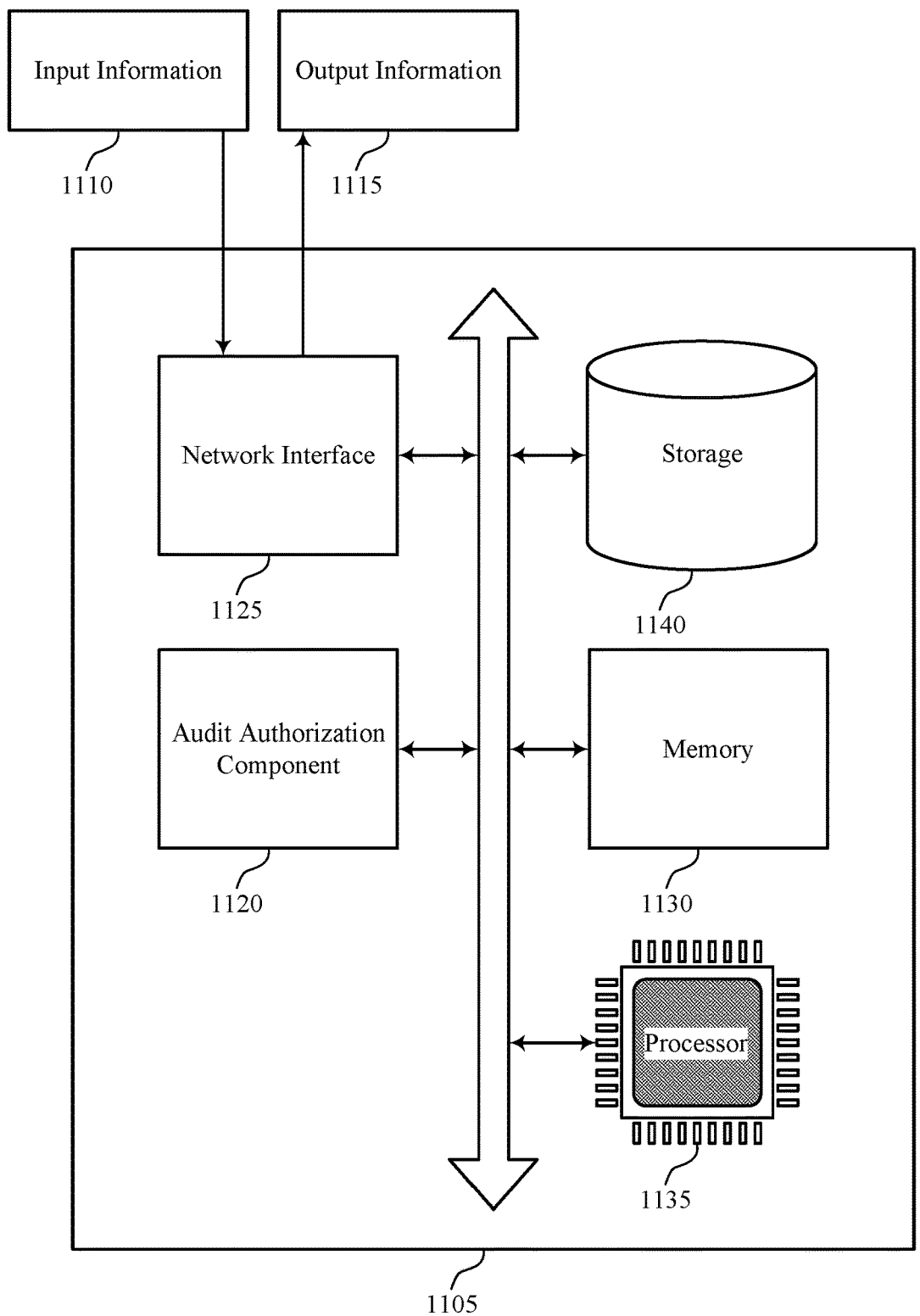
FIG. 11 illustrates a diagram of a system including a device that supports access authorization for audit information in a multi-tenancy DMS in accordance with aspects of the present disclosure.

FIG. 11 illustrates a block diagram 1100 of a system 1105 that supports access authorization for audit information in a multi-tenancy DMS in accordance with aspects of the present disclosure. The system 1105 may be an example of or include the components of a system 805, a system 905, or a DMS as described herein. The system 1105 may include components for data management, including components such as an audit authorization component 1120, an input information 1110, an output information 1115, a network interface 1125, a memory 1130, a processor 1135, and a storage 1140. These components may be in electronic communication or otherwise coupled with each other (e.g., operatively, communicatively, functionally, electronically, electrically: via one or more buses, communications links, communications interfaces, or any combination thereof). Additionally, the components of the system 1105 may include corresponding physical components or may be implemented as corresponding virtual components (e.g., components of one or more virtual machines). In some examples, the system 1105 may be an example of aspects of one or more components described with reference to FIG. 1, such as a DMS 110.

The network interface 1125 may enable the system 1105 to exchange information (e.g., input information 1110, output information 1115, or both) with other systems or devices (not shown). For example, the network interface 1125 may enable the system 1105 to connect to a network (e.g., a network 120 as described herein). The network interface 1125 may include one or more wireless network interfaces, one or more wired network interfaces, or any combination thereof. In some examples, the network interface 1125 may be an example of may be an example of aspects of one or more components described with reference to FIG. 1, such as one or more network interfaces 165.

Memory 1130 may include RAM, ROM, or both. The memory 1130 may store computer-readable, computer-executable software including instructions that, when executed, cause the processor 1135 to perform various functions described herein. In some cases, the memory 1130 may contain, among other things, a basic input/output system (BIOS), which may control basic hardware or software operation such as the interaction with peripheral components or devices. In some cases, the memory 1130 may be an example of aspects of one or more components described with reference to FIG. 1, such as one or more memories 175.

The processor 1135 may include an intelligent hardware device, (e.g., a general-purpose processor, a DSP, a CPU, a microcontroller, an ASIC, a field programmable gate array (FPGA), a programmable logic device, a discrete gate or transistor logic component, a discrete hardware component, or any combination thereof). The processor 1135 may be configured to execute computer-readable instructions stored in a memory 1130 to perform various functions (e.g., functions or tasks supporting access authorization for audit information in a multi-tenancy DMS). Though a single processor 1135 is depicted in the example of FIG. 11, it is to be understood that the system 1105 may include any quantity of one or more of processors 1135 and that a group of processors 1135 may collectively perform one or more functions ascribed herein to a processor, such as the processor 1135. In some cases, the processor 1135 may be an example of aspects of one or more components described with reference to FIG. 1, such as one or more processors 170.

Storage 1140 may be configured to store data that is generated, processed, stored, or otherwise used by the system 1105. In some cases, the storage 1140 may include one or more HDDs, one or more SDDs, or both. In some examples, the storage 1140 may be an example of a single database, a distributed database, multiple distributed databases, a data store, a data lake, or an emergency backup database. In some examples, the storage 1140 may be an example of one or more components described with reference to FIG. 1, such as one or more network disks 180.

For example, the audit authorization component 1120 may be configured as or otherwise support a means for receiving, by a DMS, a request to provide a first user of the DMS with audit information associated with an entity of the DMS, where the DMS includes a set of multiple computing objects, and where the DMS is operable to provide protection for data sources associated with a set of multiple tenants of the DMS. The audit authorization component 1120 may be configured as or otherwise support a means for identifying, in response to the request, context information for a log-in session associated with the request, where the context information for the log-in session includes an ID of a tenant associated with the request, the tenant included in the set of multiple tenants. The audit authorization component 1120 may be configured as or otherwise support a means for identifying, based on the ID of the tenant associated with the request, authorization information associated with the tenant, where the authorization information indicates that the tenant has access to a set of entities within a hierarchy associated with the set of multiple tenants. The audit authorization component 1120 may be configured as or otherwise support a means for determining whether to output, to the first user in response to the request, the audit information associated with the entity based on a hierarchical relationship, within the hierarchy, between the tenant and the entity.

By including or configuring the audit authorization component 1120 in accordance with examples as described herein, the system 1105 may support techniques for access authorization for audit information in a multi-tenancy DMS, which may provide one or more benefits such as, for example, improved data management, compliance, efficiency, and security, among other possibilities.

Figure 12:
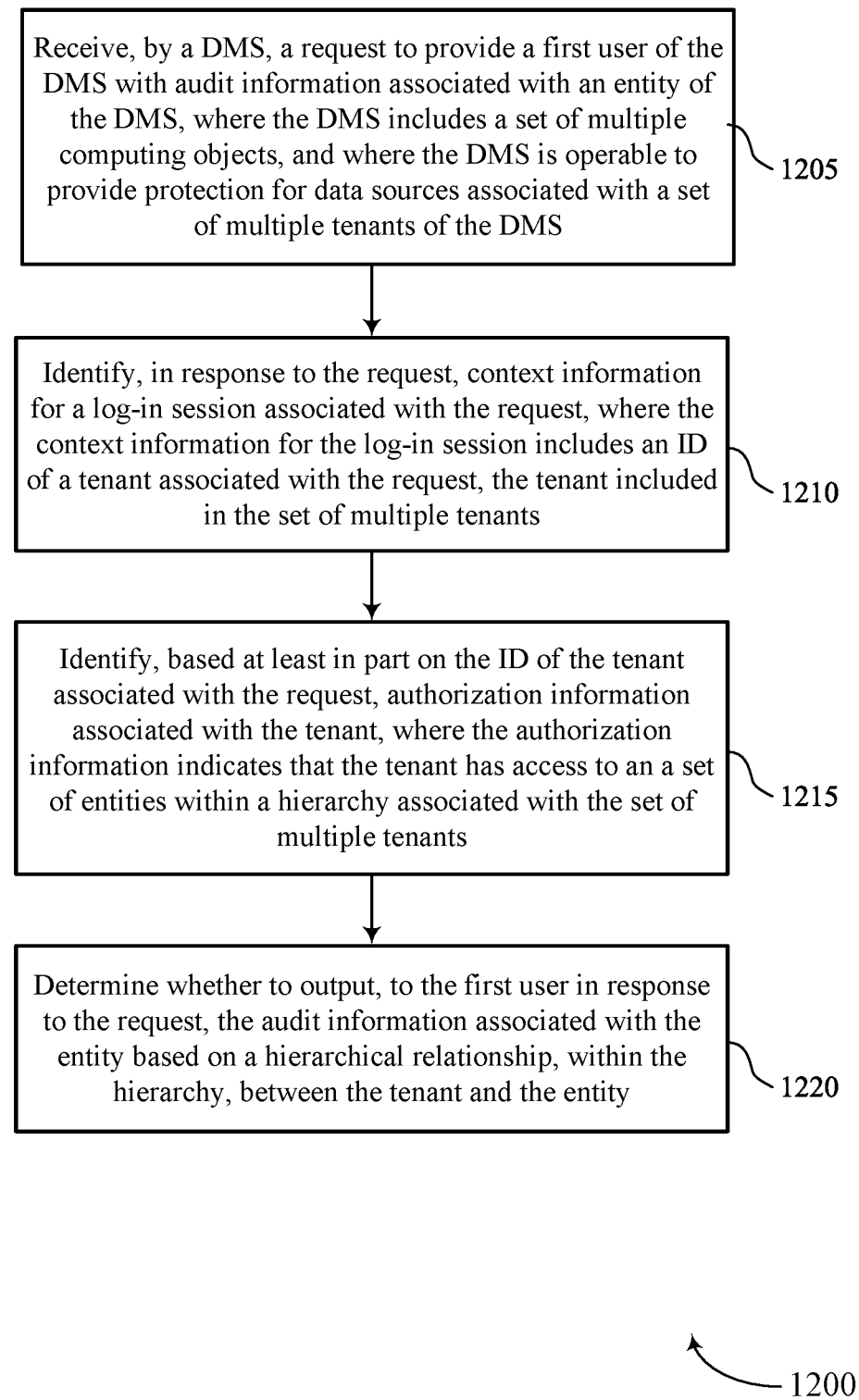
FIGS. 12 through 14 illustrate flowcharts showing methods that support access authorization for audit information in a multi-tenancy DMS in accordance with aspects of the present disclosure.

FIG. 12 illustrates a flowchart showing a method 1200 that supports access authorization for audit information in a multi-tenancy DMS in accordance with aspects of the present disclosure. The operations of the method 1200 may be implemented by a DMS or its components as described herein. For example, the operations of the method 1200 may be performed by a DMS as described with reference to FIGS. 1 through 11. In some examples, a DMS may execute a set of instructions to control the functional elements of the DMS to perform the described functions. Additionally, or alternatively, the DMS may perform aspects of the described functions using special-purpose hardware.

At 1205, the method may include receiving, by a DMS, a request to provide a first user of the DMS with audit information associated with an entity of the DMS, where the DMS includes a set of multiple computing objects, and where the DMS is operable to provide protection for data sources associated with a set of multiple tenants of the DMS. The operations of 1205 may be performed in accordance with examples as disclosed herein. In some examples, aspects of the operations of 1205 may be performed by a request component 1025 as described with reference to FIG. 10.

At 1210, the method may include identifying, in response to the request, context information for a log-in session associated with the request, where the context information for the log-in session includes an ID of a tenant associated with the request, the tenant included in the set of multiple tenants. The operations of 1210 may be performed in accordance with examples as disclosed herein. In some examples, aspects of the operations of 1210 may be performed by a context information component 1030 as described with reference to FIG. 10.

At 1215, the method may include identifying, based on the ID of the tenant associated with the request, authorization information associated with the tenant, where the authorization information indicates that the tenant has access to a set of entities within a hierarchy associated with the set of multiple tenants. The operations of 1215 may be performed in accordance with examples as disclosed herein. In some examples, aspects of the operations of 1215 may be performed by an authorization information component 1035 as described with reference to FIG. 10.

At 1220, the method may include determining whether to output, to the first user in response to the request, the audit information associated with the entity based on a hierarchical relationship, within the hierarchy, between the tenant and the entity. The operations of 1220 may be performed in accordance with examples as disclosed herein. In some examples, aspects of the operations of 1220 may be performed by an access authorization component 1040 as described with reference to FIG. 10.

Figure 13:
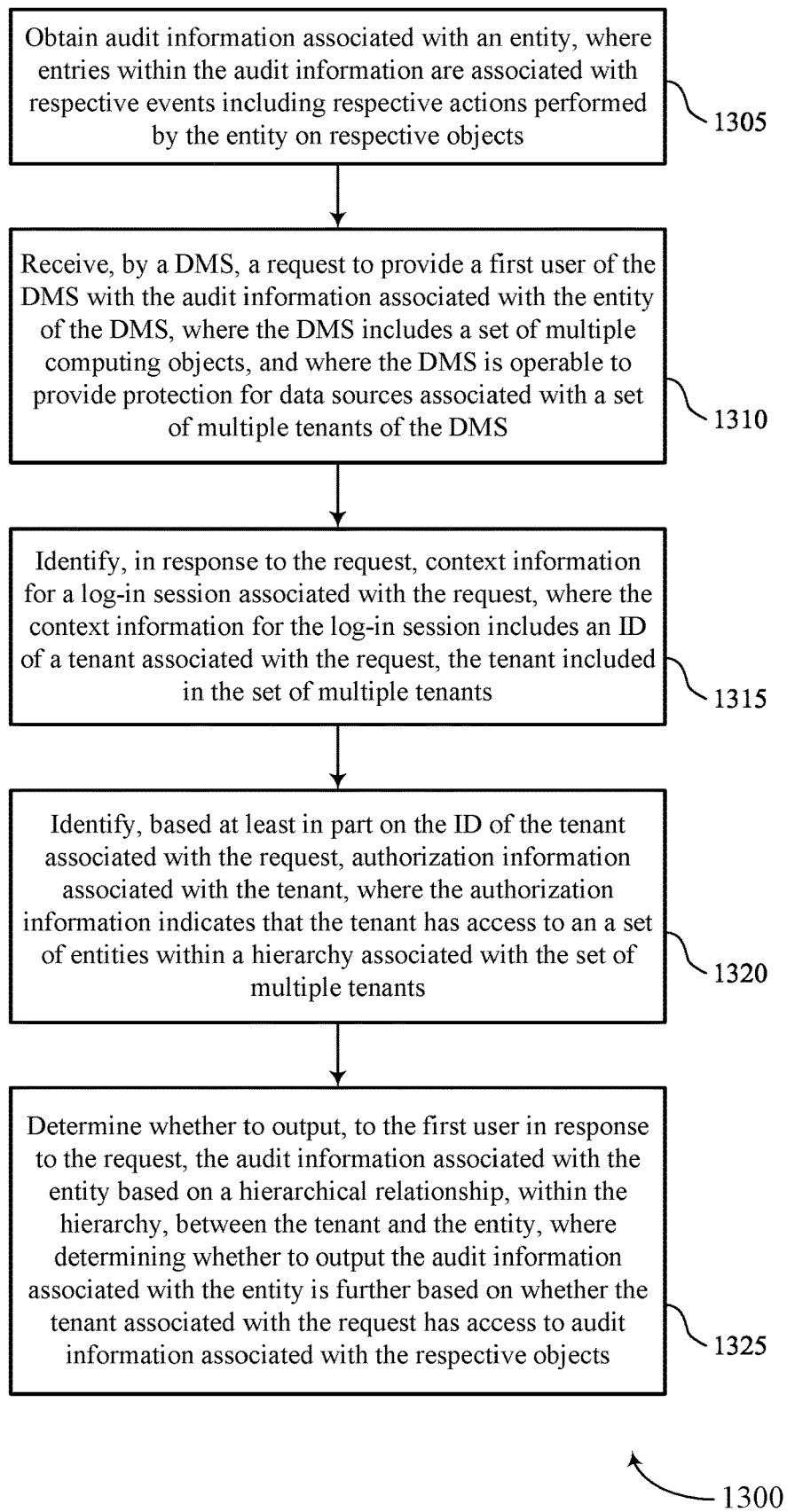

FIG. 13 illustrates a flowchart showing a method 1300 that supports access authorization for audit information in a multi-tenancy DMS in accordance with aspects of the present disclosure. The operations of the method 1300 may be implemented by a DMS or its components as described herein. For example, the operations of the method 1300 may be performed by a DMS as described with reference to FIGS. 1 through 11. In some examples, a DMS may execute a set of instructions to control the functional elements of the DMS to perform the described functions. Additionally, or alternatively, the DMS may perform aspects of the described functions using special-purpose hardware.

At 1305, the method may include obtaining audit information associated with an entity, where entries within the audit information are associated with respective events including respective actions performed by the entity on respective objects. The operations of 1305 may be performed in accordance with examples as disclosed herein. In some examples, aspects of the operations of 1305 may be performed by an audit information component 1045 as described with reference to FIG. 10.

At 1310, the method may include receiving, by a DMS, a request to provide a first user of the DMS with the audit information associated with the entity of the DMS, wherein the DMS includes a set of multiple computing objects, and where the DMS is operable to provide protection for data sources associated with a set of multiple tenants of the DMS. The operations of 1310 may be performed in accordance with examples as disclosed herein. In some examples, aspects of the operations of 1310 may be performed by a request component 1025 as described with reference to FIG. 10.

At 1315, the method may include identifying, in response to the request, context information for a log-in session associated with the request, where the context information for the log-in session includes an ID of a tenant associated with the request, the tenant included in the set of multiple tenants. The operations of 1315 may be performed in accordance with examples as disclosed herein. In some examples, aspects of the operations of 1315 may be performed by a context information component 1030 as described with reference to FIG. 10.

At 1320, the method may include identifying, based on the ID of the tenant associated with the request, authorization information associated with the tenant, where the authorization information indicates that the tenant has access to a set of entities within a hierarchy associated with the set of multiple tenants. The operations of 1320 may be performed in accordance with examples as disclosed herein. In some examples, aspects of the operations of 1320 may be performed by an authorization information component 1035 as described with reference to FIG. 10.

At 1325, the method may include determining whether to output, to the first user in response to the request, the audit information associated with the entity based on a hierarchical relationship, within the hierarchy, between the tenant and the entity, where determining whether to output the audit information associated with the entity is further based on whether the tenant associated with the request has access to audit information associated with the respective objects. The operations of 1325 may be performed in accordance with examples as disclosed herein. In some examples, aspects of the operations of 1325 may be performed by an access authorization component 1040 as described with reference to FIG. 10.

Figure 14:
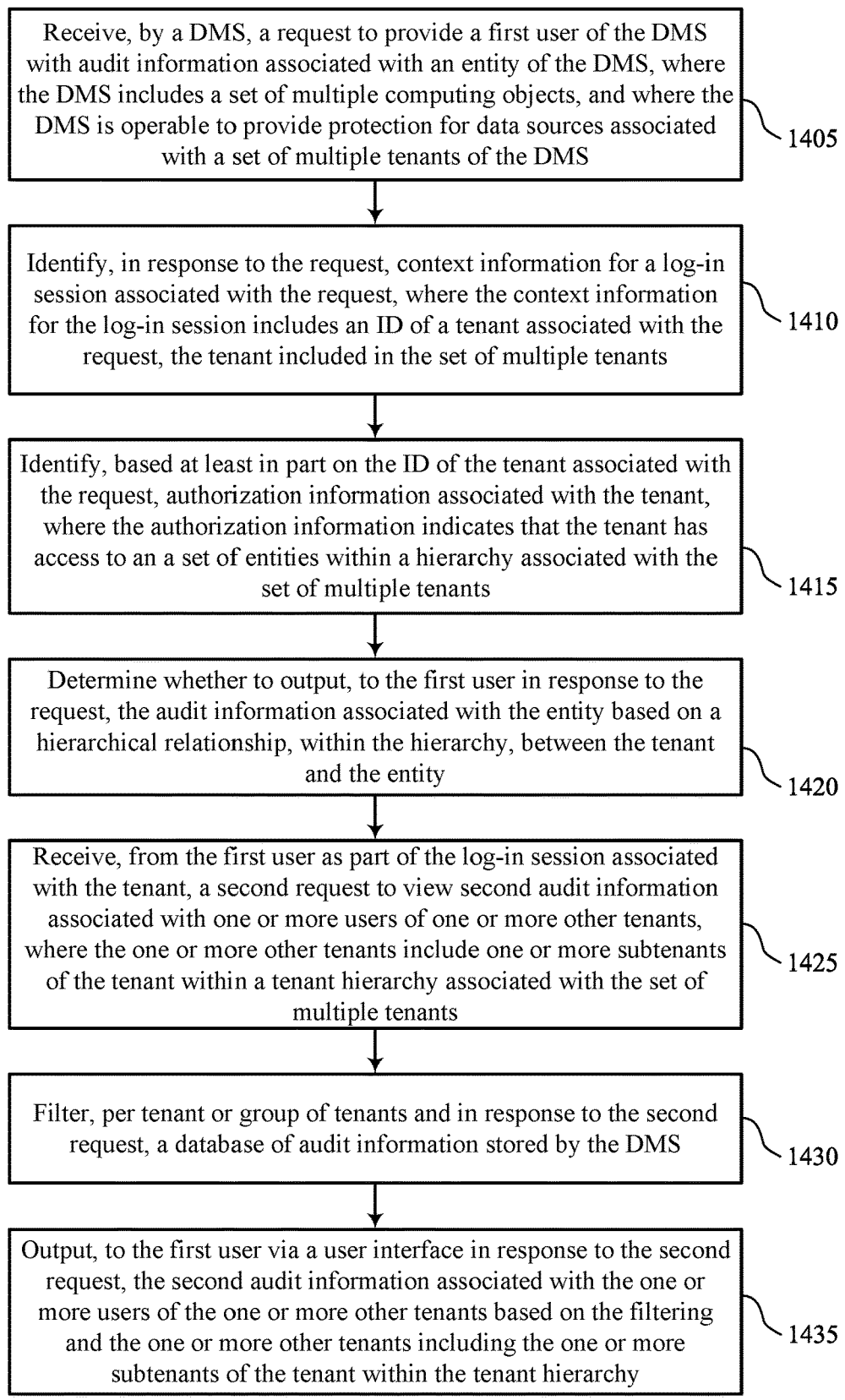

FIG. 14 illustrates a flowchart showing a method 1400 that supports access authorization for audit information in a multi-tenancy DMS in accordance with aspects of the present disclosure. The operations of the method 1400 may be implemented by a DMS or its components as described herein. For example, the operations of the method 1400 may be performed by a DMS as described with reference to FIGS. 1 through 11. In some examples, a DMS may execute a set of instructions to control the functional elements of the DMS to perform the described functions. Additionally, or alternatively, the DMS may perform aspects of the described functions using special-purpose hardware.

At 1405, the method may include receiving, by a DMS, a request to provide a first user of the DMS with audit information associated with an entity of the DMS, where the DMS includes a set of multiple computing objects, and where the DMS is operable to provide protection for data sources associated with a set of multiple tenants of the DMS. The operations of 1405 may be performed in accordance with examples as disclosed herein. In some examples, aspects of the operations of 1405 may be performed by a request component 1025 as described with reference to FIG. 10.

At 1410, the method may include identifying, in response to the request, context information for a log-in session associated with the request, where the context information for the log-in session includes an ID of a tenant associated with the request, the tenant included in the set of multiple tenants. The operations of 1410 may be performed in accordance with examples as disclosed herein. In some examples, aspects of the operations of 1410 may be performed by a context information component 1030 as described with reference to FIG. 10.

At 1415, the method may include identifying, based on the ID of the tenant associated with the request, authorization information associated with the tenant, where the authorization information indicates that the tenant has access to a set of entities within a hierarchy associated with the set of multiple tenants. The operations of 1415 may be performed in accordance with examples as disclosed herein. In some examples, aspects of the operations of 1415 may be performed by an authorization information component 1035 as described with reference to FIG. 10.

At 1420, the method may include determining whether to output, to the first user in response to the request, the audit information associated with the entity based on a hierarchical relationship, within the hierarchy, between the tenant and the entity. The operations of 1420 may be performed in accordance with examples as disclosed herein. In some examples, aspects of the operations of 1420 may be performed by an access authorization component 1040 as described with reference to FIG. 10.

At 1425, the method may include receiving, from the first user as part of the log-in session associated with the tenant, a second request to view second audit information associated with one or more users of one or more other tenants, where the one or more other tenants include one or more subtenants of the tenant within a tenant hierarchy associated with the set of multiple tenants. The operations of 1425 may be performed in accordance with examples as disclosed herein. In some examples, aspects of the operations of 1425 may be performed by a request component 1025 as described with reference to FIG. 10.

At 1430, the method may include filtering, per tenant or group of tenants and in response to the second request, a database of audit information stored by the DMS. The operations of 1430 may be performed in accordance with examples as disclosed herein. In some examples, aspects of the operations of 1430 may be performed by an audit information filtering component 1060 as described with reference to FIG. 10.

At 1435, the method may include outputting, to the first user via a user interface in response to the second request, the second audit information associated with the one or more users of the one or more other tenants based on the filtering and the one or more other tenants including the one or more subtenants of the tenant within the tenant hierarchy. The operations of 1435 may be performed in accordance with examples as disclosed herein. In some examples, aspects of the operations of 1435 may be performed by an audit information filtering component 1060 as described with reference to FIG. 10.

A method is described. The method may include receiving, by a DMS, a request to provide a first user of the DMS with audit information associated with an entity of the DMS, where the DMS includes a set of multiple computing objects, and where the DMS is operable to provide protection for data sources associated with a set of multiple tenants of the DMS, identifying, in response to the request, context information for a log-in session associated with the request, where the context information for the log-in session includes an ID of a tenant associated with the request, the tenant included in the set of multiple tenants, identifying, based on the ID of the tenant associated with the request, authorization information associated with the tenant, where the authorization information indicates that the tenant has access to a set of entities within a hierarchy associated with the set of multiple tenants, and determining whether to output, to the first user in response to the request, the audit information associated with the entity based on a hierarchical relationship, within the hierarchy, between the tenant and the entity.

An apparatus is described. The apparatus may include a processor, memory coupled with the processor, and instructions stored in the memory. The instructions may be executable by the processor to cause the apparatus to receive, by a DMS, a request to provide a first user of the DMS with audit information associated with an entity of the DMS, where the DMS includes a set of multiple computing objects, and where the DMS is operable to provide protection for data sources associated with a set of multiple tenants of the DMS, identify, in response to the request, context information for a log-in session associated with the request, where the context information for the log-in session includes an ID of a tenant associated with the request, the tenant included in the set of multiple tenants, identify, based on the ID of the tenant associated with the request, authorization information associated with the tenant, where the authorization information indicates that the tenant has access to a set of entities within a hierarchy associated with the set of multiple tenants, and determine whether to output, to the first user in response to the request, the audit information associated with the entity based on a hierarchical relationship, within the hierarchy, between the tenant and the entity.

Another apparatus is described. The apparatus may include means for receiving, by a DMS, a request to provide a first user of the DMS with audit information associated with an entity of the DMS, where the DMS includes a set of multiple computing objects, and where the DMS is operable to provide protection for data sources associated with a set of multiple tenants of the DMS, means for identifying, in response to the request, context information for a log-in session associated with the request, where the context information for the log-in session includes an ID of a tenant associated with the request, the tenant included in the set of multiple tenants, means for identifying, based on the ID of the tenant associated with the request, authorization information associated with the tenant, where the authorization information indicates that the tenant has access to a set of entities within a hierarchy associated with the set of multiple tenants, and means for determining whether to output, to the first user in response to the request, the audit information associated with the entity based on a hierarchical relationship, within the hierarchy, between the tenant and the entity.

A non-transitory computer-readable medium storing code is described. The code may include instructions executable by a processor to receive, by a DMS, a request to provide a first user of the DMS with audit information associated with an entity of the DMS, where the DMS includes a set of multiple computing objects, and where the DMS is operable to provide protection for data sources associated with a set of multiple tenants of the DMS, identify, in response to the request, context information for a log-in session associated with the request, where the context information for the log-in session includes an ID of a tenant associated with the request, the tenant included in the set of multiple tenants, identify, based on the ID of the tenant associated with the request, authorization information associated with the tenant, where the authorization information indicates that the tenant has access to a set of entities within a hierarchy associated with the set of multiple tenants, and determine whether to output, to the first user in response to the request, the audit information associated with the entity based on a hierarchical relationship, within the hierarchy, between the tenant and the entity.

Some examples of the method, apparatuses, and non-transitory computer-readable medium described herein may further include operations, features, means, or instructions for obtaining the audit information associated with the entity, where entries within the audit information may be associated with respective events including respective actions performed by the entity on respective objects, and where determining whether to output the audit information associated with the entity may be further based on whether the tenant associated with the request may have access to audit information associated with the respective objects.

Some examples of the method, apparatuses, and non-transitory computer-readable medium described herein may further include operations, features, means, or instructions for obtaining the audit information associated with the entity, where entries within the audit information may be associated with respective events including respective actions performed by respective subjects on the entity, and where determining whether to output the audit information associated with the entity may be further based on whether the tenant associated with the request may have access to audit information associated with the respective subjects.

In some examples of the method, apparatuses, and non-transitory computer-readable medium described herein, the authorization information indicates that the tenant may have access to an authentication domain within the hierarchy, the hierarchy including an authentication hierarchy associated with the set of multiple tenants and the hierarchical relationship indicates a relationship between the entity and the authentication domain in the authentication hierarchy.

Some examples of the method, apparatuses, and non-transitory computer-readable medium described herein may further include operations, features, means, or instructions for outputting, to the first user in response to the request, the audit information associated with the entity based on the hierarchical relationship indicating that the entity may be below the authentication domain within the authentication hierarchy.

Some examples of the method, apparatuses, and non-transitory computer-readable medium described herein may further include operations, features, means, or instructions for refraining from outputting, to the first user in response to the request, the audit information associated with the entity based on the hierarchical relationship indicating that the entity may be not below the authentication domain within the authentication hierarchy.

In some examples of the method, apparatuses, and non-transitory computer-readable medium described herein, the authentication domain includes a node within the authentication hierarchy, the node above a single user of a set of multiple users of the DMS in the authentication hierarchy.

In some examples of the method, apparatuses, and non-transitory computer-readable medium described herein, the authentication domain includes a node within the authentication hierarchy, the node above a user group of the DMS in the authentication hierarchy.

In some examples of the method, apparatuses, and non-transitory computer-readable medium described herein, the authorization information indicates a set of one or more objects to which the tenant associated with the request may have access within the hierarchy, the hierarchy including an object hierarchy associated with a set of multiple objects of the DMS and the hierarchical relationship indicates a relationship between the entity and the set of one or more objects in the object hierarchy.

Some examples of the method, apparatuses, and non-transitory computer-readable medium described herein may further include operations, features, means, or instructions for identifying an audit event for a third user of the DMS, identifying, in response to identifying the audit event, second context information for a second log-in session associated with the third user, where the second context information for the second log-in session includes a second ID of a second tenant associated with the third user, the second tenant included in the set of multiple tenants, and storing, in a database, second audit information associated with the audit event and the second ID of the second tenant associated with the third user.

Some examples of the method, apparatuses, and non-transitory computer-readable medium described herein may further include operations, features, means, or instructions for monitoring one or more operations performed by the third user of the DMS based on the third user initiating the second log-in session, where identifying the audit event includes identifying an operation of the one or more operations.

Some examples of the method, apparatuses, and non-transitory computer-readable medium described herein may further include operations, features, means, or instructions for receiving, from the first user as part of the log-in session associated with the tenant, a second request to view second audit information associated with one or more users of one or more other tenants, where the one or more other tenants include one or more subtenants of the tenant within a tenant hierarchy associated with the set of multiple tenants, filtering, per tenant or group of tenants and in response to the second request, a database of audit information stored by the DMS, and outputting, to the first user via a user interface in response to the second request, the second audit information associated with the one or more users of the one or more other tenants based on the filtering and the one or more other tenants including one or more subtenants of the tenant within the tenant hierarchy.

In some examples of the method, apparatuses, and non-transitory computer-readable medium described herein, filtering the database of audit information per tenant or group of tenants may include operations, features, means, or instructions for selecting the second audit information from among the database of audit information based on the second audit information including the ID of the tenant associated with the request, where remaining audit information in the database includes IDs of other tenants included in the set of multiple tenants.

In some examples of the method, apparatuses, and non-transitory computer-readable medium described herein, the first user initiates a second log-in session with the DMS after the log-in session, and second context information for the second log-in session associated with the first user includes a second ID of a second tenant included in the set of multiple tenants, the second tenant different than the tenant associated with the request.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Further, a system as used herein may be a collection of devices, a single device, or aspects within a single device.

Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, EEPROM) compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method, comprising:

storing, by a data management system, audit information that indicates information associated with one or more events performed by a second user on a computing object of the data management system, wherein the audit information further indicates respective identifiers of the second user and the computing object based at least in part on the second user being a subject of the one or more events and the computing object being an object of the one or more events, and wherein the data management system comprises a plurality of computing objects and is operable to provide protection for data sources associated with a plurality of tenants of the data management system;

receiving, by the data management system, a request to provide a first user of the data management system with the audit information associated with the one or more events performed by the second user on the computing object, wherein the first user is associated with a first tenant of the plurality of tenants of the data management system, and wherein the second user is associated with a second tenant of the plurality of tenants of the data management system, identifying, in response to the request, context information for a log-in session associated with the request, wherein the context information for the log-in session comprises an identifier of the first tenant associated with the first user and the request, wherein the second tenant of the second user associated with the audit information is different than the first tenant associated with the first user and the request;

identifying, based at least in part on the identifier of the first tenant associated with the first user and the request, authorization information associated with the first tenant, wherein the authorization information indicates:

a set of one or more computing objects to which the first tenant associated with the first user and the request has access within an object hierarchy associated with the plurality of computing objects of the data management system in accordance with a hierarchical relationship, within the object hierarchy, between the first tenant and the set of one or more computing objects; and a set of one or more second users to which the first tenant associated with the first user and the request has access within an authentication hierarchy associated with the plurality of tenants and a plurality of users of the data management system in accordance with a second hierarchical relationship, within the authentication hierarchy, between the first tenant and an authentication domain comprising the set of one or more second users; and determining to output, to the first user associated with the first tenant and in response to the request, the audit information associated with the one or more events performed on the computing object by the second user associated with the second tenant based at least in part on the set of one or more computing objects indicated via the authorization information comprising at least the computing object associated with the audit information and further based at least in part on the set of one or more second users indicated via the authorization information comprising at least the second user associated with the audit information.

2. The method of claim 1, wherein determining to output the audit information is further based at least in part on whether the first tenant associated with the first user and the request has access to the audit information associated with the one or more events performed on the computing object in accordance with the authorization information.

3. The method of claim 1, further comprising:
obtaining the audit information, wherein entries within the audit information are associated with the one or more events comprising respective actions performed by the second user on the computing object, and wherein determining to output the audit information associated is further based at least in part on whether the first tenant associated with the first user and the request has access to the audit information associated with the second user.

4. The method of claim 1, wherein the
authorization information indicates that the first tenant has access to the authentication domain within the authentication hierarchy.

5. The method of claim 4, further comprising:
outputting, to the first user in response to the request, the audit information based at least in part on the second hierarchical relationship indicating that the second user is below the authentication domain within the authentication hierarchy.

6. The method of claim 4, wherein the authentication domain comprises a node within the authentication hierarchy, the node above a single user of the plurality of users of the data management system in the authentication hierarchy.

7. The method of claim 4, wherein the authentication domain comprises a node within the authentication hierarchy, the node above a user group of the data management system in the authentication hierarchy.

8. The method of claim 1, further comprising:
identifying an audit event for a third user of the data management system;
identifying, in response to identifying the audit event, second context information for a second log-in session associated with the third user, wherein the second context information for the second log-in session comprises a second identifier of a third tenant associated with the third user, the third tenant included in the plurality of tenants; and
storing, in a database, second audit information associated with the audit event and the second identifier of the third tenant associated with the third user.

9. The method of claim 8, further comprising:
monitoring one or more operations performed by the third user of the data management system based at least in part on the third user initiating the second log-in session, wherein identifying the audit event comprises identifying an operation of the one or more operations.

10. The method of claim 1, further comprising:
receiving, from the first user as part of the log-in session associated with the first tenant, a second request to view second audit information associated with one or more second users of one or more other tenants, wherein the one or more other tenants comprise one or more subtenants of the first tenant within a tenant hierarchy associated with the plurality of tenants;
filtering, per tenant or group of tenants and in response to the second request, a database of audit information stored by the data management system; and
outputting, to the first user via a user interface in response to the second request, the second audit information associated with the one or more second users of the one or more other tenants based at least in part on the filtering and the one or more other tenants comprising the one or more subtenants of the first tenant within the tenant hierarchy.

11. The method of claim 10, wherein filtering the database of audit information per tenant or group of tenants comprises:
selecting the second audit information from among the database of audit information based at least in part on the second audit information comprising the identifier of the first tenant associated with the request, wherein remaining audit information in the database comprises identifiers of other tenants included in the plurality of tenants.

12. The method of claim 1, wherein the first user initiates a second log-in session with the data management system after the log-in session, and second context information for the second log-in session associated with the first user comprises a second identifier of a third tenant included in the plurality of tenants, the third tenant different than the first tenant associated with the request.

13. An apparatus, comprising:
a processor;
memory coupled with the processor; and
instructions stored in the memory and executable by the processor to cause the apparatus to:
store, by a data management system, audit information that indicates information associated with one or more events performed by a second user on a computing object of the data management system, wherein the audit information further indicates respective identifiers of the second user and the computing object based at least in part on the second user being a subject of the one or more events and the computing object being an object of the one or more events, and wherein the data management system comprises a plurality of computing objects and is operable to provide protection for data sources associated with a plurality of tenants of the data management system;
receive, by the data management system, a request to provide a first user of the data management system with the audit information associated with the one or more events performed by the second user on the computing object, wherein the first user is associated with a first tenant of the plurality of tenants of the data management system, and wherein the second user is associated with a second tenant of the plurality of tenants of the data management system;
identify, in response to the request, context information for a log-in session associated with the request, wherein the context information for the log-in session comprises an identifier of the first tenant associated with the first user and the request, wherein the second tenant of the second user associated with the audit information is different than the first tenant associated with the first user and the request;

identify, based at least in part on the identifier of the first tenant associated with the first user and the request, authorization information associated with the first tenant, wherein the authorization information indicates;

a set of one or more computing objects to which the first tenant associated with the first user and the request has access within an object hierarchy associated with the plurality of computing objects of the data management system in accordance with a hierarchical relationship, within the object hierarchy, between the first tenant and the set of one or more computing objects; and a set of one or more second users to which the first tenant associated with the first user and the request has access within an authentication hierarchy associated with the plurality of tenants and a plurality of users of the data management system in accordance with a second hierarchical relationship, within the authentication hierarchy, between the first tenant and an authentication domain comprising the set of one or more second users; and determine to output, to the first user associated with the first tenant and in response to the request, the audit information associated with the one or more events performed on the computing object by the second user associated with the second tenant based at least in part on the set of one or more computing objects indicated via the authorization information comprising at least the computing object associated with the audit information and further based at least in part on the set of one or more second users indicated via the authorization information comprising at least the second user associated with the audit information.

14. The apparatus of claim 13, wherein the instructions are executable by the processor to cause the apparatus to determine to output the audit information further based at least in part on whether the first tenant associated with the first user and the request has access to the audit information associated with the one or more events performed on the computing object in accordance with the authorization information.

15. The apparatus of claim 13, wherein the instructions are further executable by the processor to cause the apparatus to:

obtain the audit information, wherein entries within the audit information are associated with the one or more events comprising respective actions performed by the second user on the computing object, and wherein determining to output the audit information associated is further based at least in part on whether the first tenant associated with the first user and the request has access to the audit information associated with the second user.

16. The apparatus of claim 13, wherein the instructions are further executable by the processor to cause the apparatus to:

identify an audit event for a third user of the data management system;

identify, in response to identifying the audit event, second context information for a second log-in session associated with the third user, wherein the second context information for the second log-in session comprises a second identifier of a third tenant associated with the third user, the third tenant included in the plurality of tenants; and store, in a database, second audit information associated with the audit event and the second identifier of the third tenant associated with the third user.

17. A non-transitory computer-readable medium storing code, the code comprising instructions executable by a processor to:

store, by a data management system, audit information that indicates information associated with one or more events performed by a second user on a computing object of the data management system, wherein the audit information further indicates respective identifiers of the second user and the computing object based at least in part on the second user being a subject of the one or more events and the computing object being an object of the one or more events, and wherein the data management system comprises a plurality of computing objects and is operable to provide protection for data sources associated with a plurality of tenants of the data management system;

receive, by the data management system, a request to provide a first user of the data management system with the audit information associated with the one or more events performed by the second user on the computing object, wherein the first user is associated with a first tenant of the plurality of tenants of the data management system, and wherein the second user is associated with a second tenant of the plurality of tenants of the data management system;

identify, in response to the request, context information for a log-in session associated with the request, wherein the context information for the log-in session comprises an identifier of the first tenant associated with the first user and the request, wherein the second tenant of the second user associated with the audit information is different than the first tenant associated with the first user and the request;

identify, based at least in part on the identifier of the first tenant associated with the first user and the request, authorization information associated with the first tenant, wherein the authorization information indicates:

a set of one or more computing objects to which the first tenant associated with the first user and the request has access within an object hierarchy associated with the plurality of computing objects of the data management system in accordance with a hierarchical relationship, within the object hierarchy, between the first tenant and the set of one or more computing objects; and a set of one or more second users to which the first tenant associated with the first user and the request has access within an authentication hierarchy associated with the plurality of tenants and a plurality of users of the data management system in accordance with a second hierarchical relationship, within the authentication hierarchy, between the first tenant and an authentication domain comprising the set of one or more second users; and determine to output, to the first user associated with the first tenant and in response to the request, the audit information associated with the one or more events performed on the computing object by the second user associated with the second tenant based at least in part on the set of one or more computing objects indicated via the authorization information comprising at least the computing object associated with the audit information and further based at least in part on the set of one or more second users indicated via the authorization information comprising at least the second user associated with the audit information.

18. The non-transitory computer-readable medium of claim 17, wherein the instructions are executable by a processor to determine to output the audit information further based at least in part on whether the first tenant associated with the first user and the request has access to the audit information associated with the one or more events performed on the computing object in accordance with the authorization information.

* * * * *